(12) United States Patent
Schell et al.

(10) Patent No.: US 10,870,216 B2
(45) Date of Patent: Dec. 22, 2020

(54) TABLE SAWS HAVING INTEGRATED CONTROL SYSTEMS

(75) Inventors: Craig A. Schell, Street, MD (US); Robert A. Usselman, Forest Hill, MD (US)

(73) Assignee: BLACK & DECKER INC., New Britain, CT (US)

( * ) Notice: Subject to any disclaimer, the term of this patent is extended or adjusted under 35 U.S.C. 154(b) by 1331 days.

(21) Appl. No.: 12/561,309

(22) Filed: Sep. 17, 2009

(65) Prior Publication Data

US 2010/0257990 A1 Oct. 14, 2010

Related U.S. Application Data

(60) Provisional application No. 61/101,182, filed on Sep. 30, 2008.

(51) Int. Cl.

| | |
|---|---|
| *B27G 19/02* | (2006.01) |
| *B27G 19/08* | (2006.01) |
| *B27G 19/10* | (2006.01) |
| *F16P 3/08* | (2006.01) |
| *F16P 3/14* | (2006.01) |

(52) U.S. Cl.
CPC .............. *B27G 19/02* (2013.01); *B27G 19/08* (2013.01); *B27G 19/10* (2013.01); *F16P 3/08* (2013.01); *F16P 3/148* (2013.01); *Y10S 83/01* (2013.01); *Y10T 83/081* (2015.04); *Y10T 83/606* (2015.04); *Y10T 83/773* (2015.04); *Y10T 83/7734* (2015.04); *Y10T 83/85* (2015.04)

(58) Field of Classification Search
CPC .......... B27G 19/02; B27G 19/08; B27G 19/10
See application file for complete search history.

(56) References Cited

U.S. PATENT DOCUMENTS

| | | | | |
|---|---|---|---|---|
| 4,033,218 | A | * | 7/1977 | Donatelle ..................... 83/478 |
| 5,181,447 | A | * | 1/1993 | Hewitt .................. B23Q 3/002 83/447 |
| 6,418,829 | B1 | * | 7/2002 | Pilchowski .................... 83/397 |
| 7,137,327 | B2 | | 11/2006 | Garcia |
| 2007/0097566 | A1 | | 5/2007 | Woods et al. |
| 2007/0163408 | A1 | | 7/2007 | Buck et al. |
| 2007/0186739 | A1 | | 8/2007 | Peot et al. |
| 2007/0186741 | A1 | | 8/2007 | Buck et al. |

(Continued)

OTHER PUBLICATIONS

European Search Report issued in corresponding European Patent Application No. EP 09 17 1377, dated Nov. 29, 2012, 7 pp.

*Primary Examiner* — Clark F Dexter
(74) *Attorney, Agent, or Firm* — Adan Ayala

(57) ABSTRACT

A power tool having an integrated control system includes a workpiece supporting surface, a cutting instrument extendable above the workpiece supporting surface, a guard assembly securable above the workpiece supporting surface for covering at least a portion of the cutting instrument, a motor coupled with the cutting instrument, and a power switch operable for starting the motor for driving the cutting instrument. The power tool includes a control system in communication with the guard assembly for determining if the guard assembly is installed. Before the motor is started, the control system automatically disables the motor if it determines that the guard assembly is not installed. The control system includes a bypass switch for enabling starting of the motor when the guard assembly is not installed.

25 Claims, 24 Drawing Sheets

(56) References Cited

U.S. PATENT DOCUMENTS

2008/0022820 A1 1/2008 Merhar et al.
2008/0022827 A1 1/2008 Weir et al.
2008/0110653 A1 5/2008 Zhang et al.

\* cited by examiner

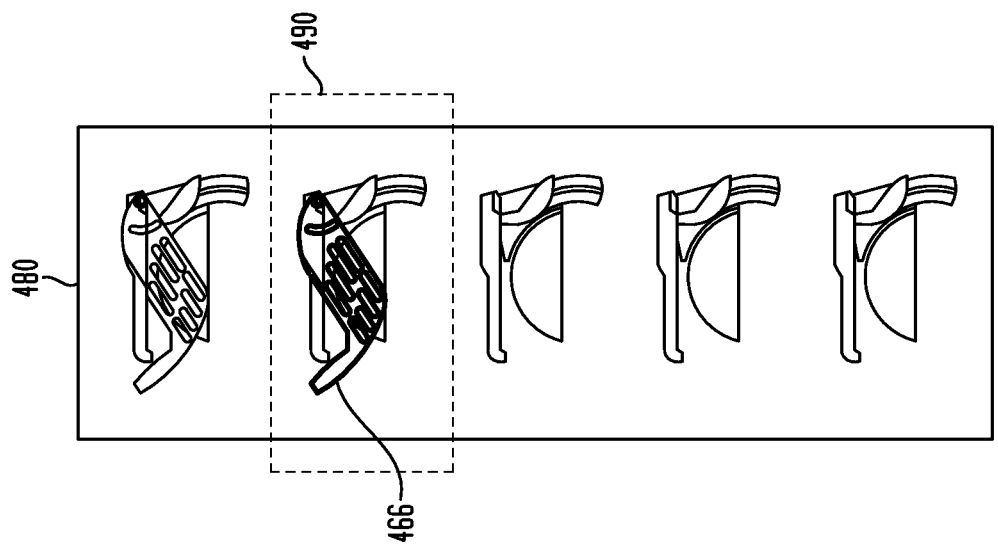
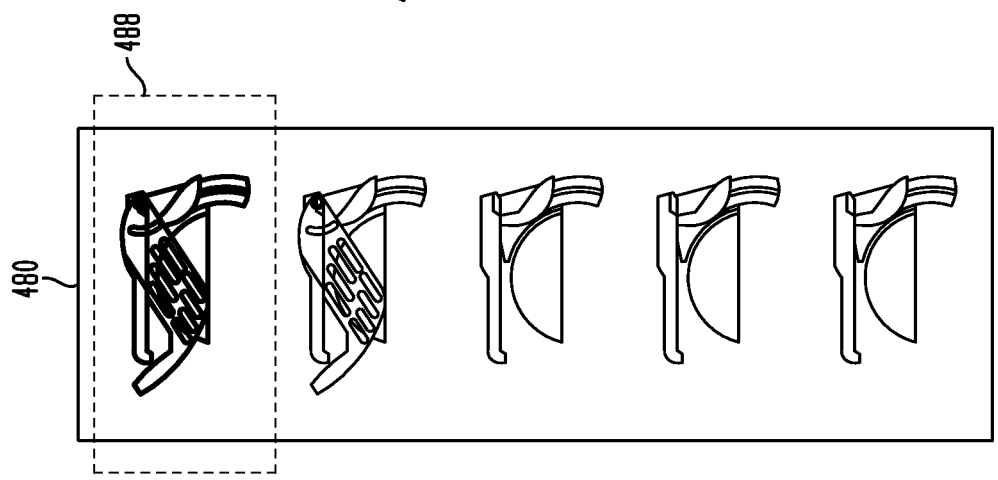
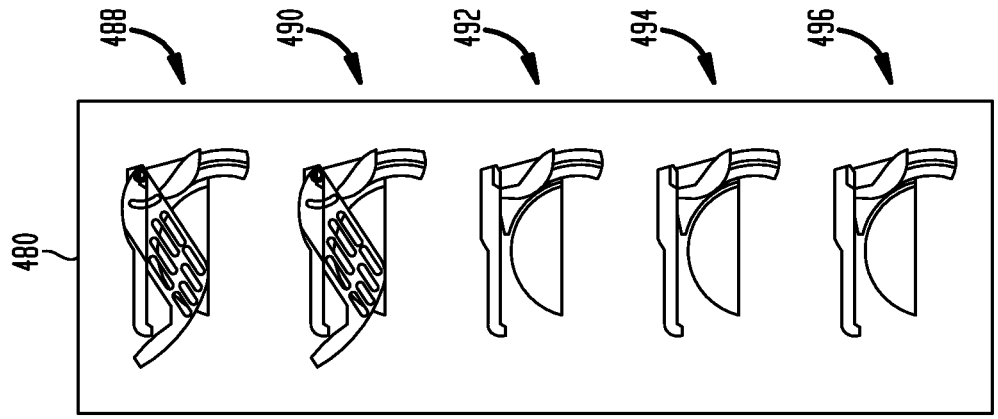

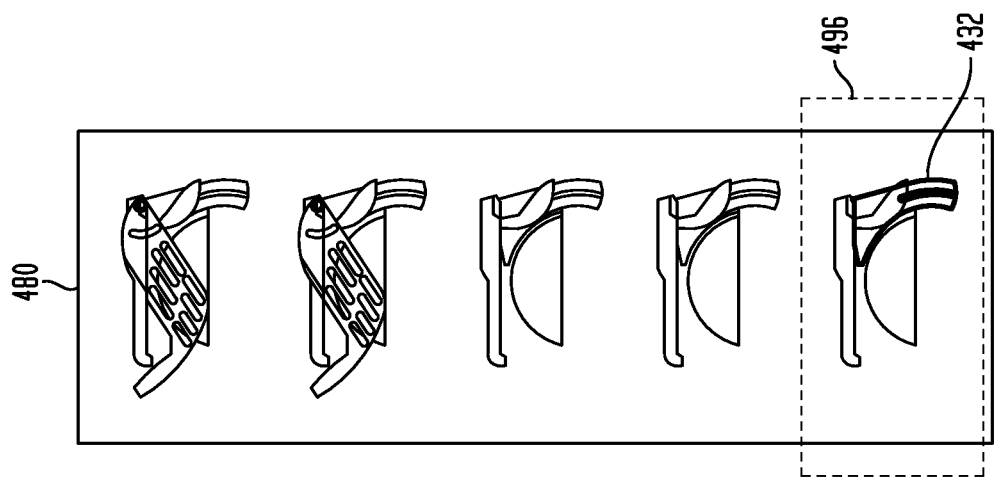
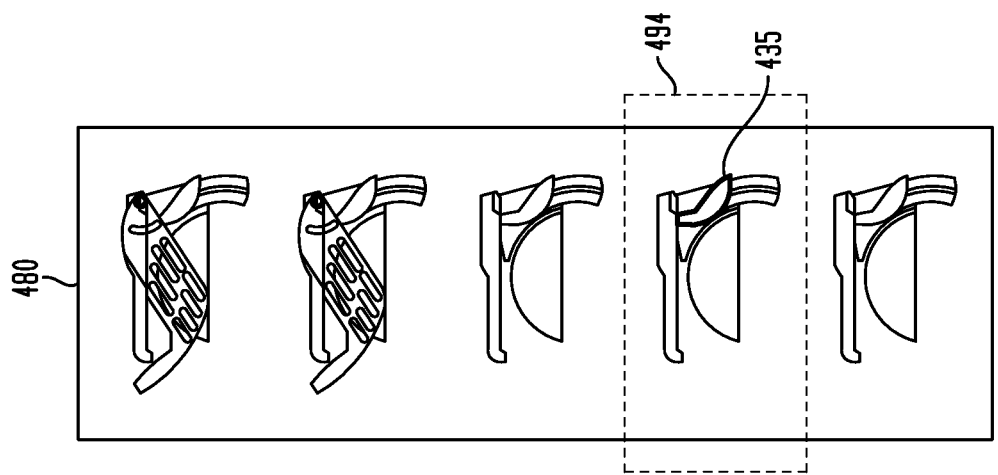
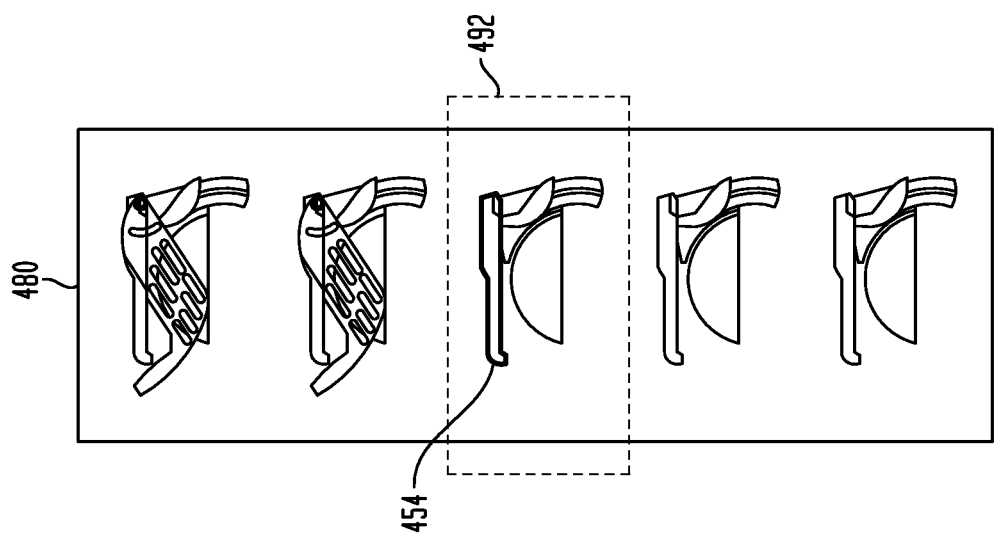

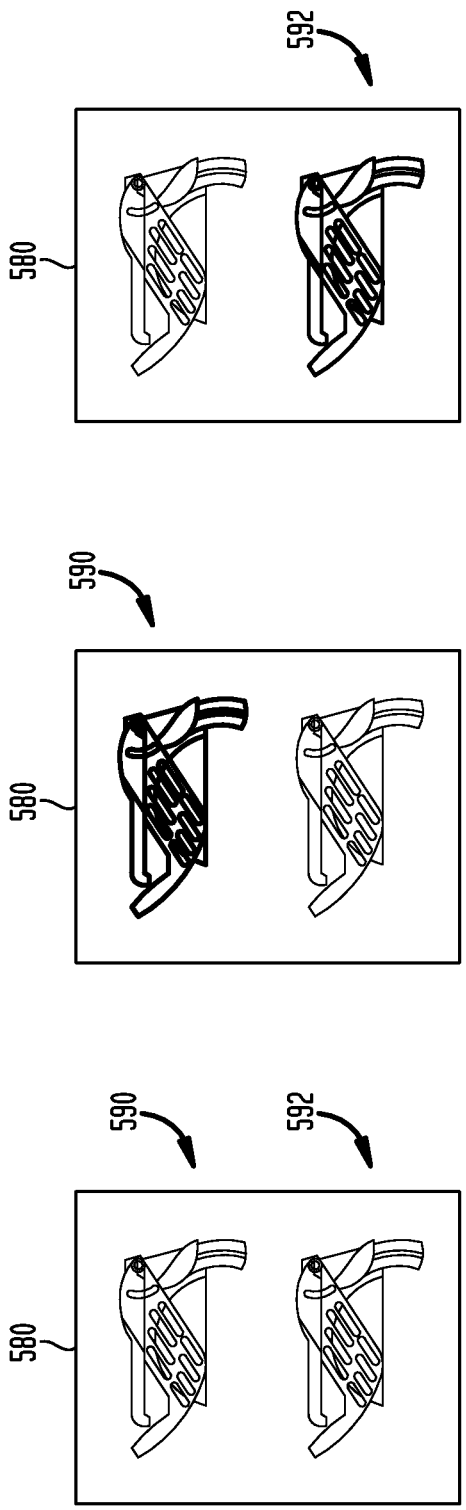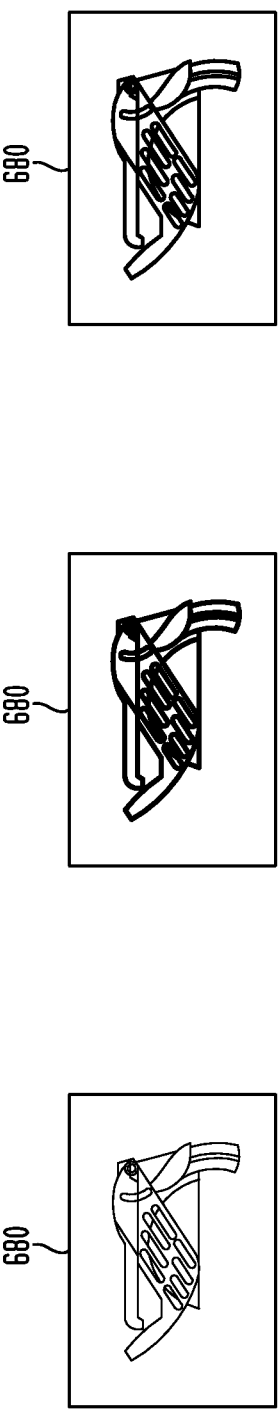

TABLE SAWS HAVING INTEGRATED CONTROL SYSTEMS

CROSS-REFERENCE TO RELATED APPLICATIONS

The present application claims the benefit of commonly assigned U.S. Provisional Application No. 61/101,182, filed Sep. 30, 2008, the disclosure of which is hereby incorporated by reference herein.

BACKGROUND OF THE INVENTION

Field of the Invention

The present invention generally relates to power saws, and more specifically relates to table saws having integrated control systems.

Description of the Related Art

Table saws typically include a base or frame that supports a table having a planar top surface. The table generally includes a slot through which a cutting member, such as a circular saw blade, protrudes above the top surface of the table. Most table saws have a splitter that is mounted in alignment with a trailing end of the saw blade. When cutting a workpiece, the splitter maintains the two portions of the workpiece that have been cut spaced from one another to reduce the possibility of workpiece kickback. Many conventional table saws also include top guards and side guards that protect the operator from injury caused by accidental contact with a rotating saw blade. In some instances, the splitter, the top guards, and/or the side guards may be removed to make certain types of cuts, such as non-through cuts.

There have been many efforts seeking to encourage operators to leave guarding in place or to place guarding back on table saws after specific projects requiring their temporary removal have been completed. For example, in one embodiment, commonly assigned U.S. Patent Application Publication No. 2007/0163408, the disclosure of which is hereby incorporated by reference herein, discloses a table saw guard that enables the guard to be removed and reattached without the use of tools. The table saw guard includes a riving knife and guard assembly that provides a clear view of the work zone, blade and work piece, and is easily adjustable to accommodate different size workpieces and cutting angles. In one embodiment, the riving knife extends upwardly from the table and is substantially coplanar with the saw blade, and the guard assembly is releaseably attached to an upper end of the riving knife using a rotatable latch.

In some instances, it may be advisable to automatically shut down a table saw if the guard has been removed. In one embodiment, commonly assigned U.S. Pat. No. 6,418,829, the disclosure of which is hereby incorporated by reference herein, teaches a control device for a power tool including a protective guard provided over a cutting blade that prevents the use of the power tool when the protective guard is not in place. The control device includes a proximity detector that detects a distance between the guard and a table top, and an interlock system that prevents operation of the power tool when a distance less than a predetermined relative proximity is not detected. A pair of magnets is secured to the guard and a pair of reed switches is mounted beneath the table top. The reed switches are closed when the guard is in place. The interlock system allows the saw to be started when the reed switches are both closed and prevents start up when the reed switches are open. When the guard is not present the saw motor may be started using a key-activated bypass circuit.

In spite of the above advances, there remains a need for mechanical guard assemblies for table saws that protect users from accidentally contacting rotating saw blades during operation, while providing users with a sufficient viewing area of the cutting zone between the workpiece and the saw blade. There also remains a need for guard assemblies that are easily removable and reinstallable so that users will be more likely to reinstall the guarding after it has been removed for performing specific cuts, rather than continuing to operate the table saw without the guard. In addition, there remains a need for table saws having integrated control systems that inform an operator of the guard status of the saw, that require a bypass operation to be performed before using the table saw without guarding in place, and that prevent an operator from tampering with the system to overcome the control system. Moreover, there remains a need for table saws having integrated control systems that are may not be easily overridden, bypassed, or fooled by an operator.

SUMMARY OF THE INVENTION

In one embodiment, a power tool such as a table saw desirably has an integrated control system that may include a workpiece supporting surface, a cutting instrument extendable above the workpiece supporting surface, and a guard assembly securable above the workpiece supporting surface for covering at least a portion of the cutting instrument. The guard assembly preferably includes a first state for providing a first level of protection and a second state for providing a second level of protection. The power tool preferably includes a motor coupled with the cutting instrument, a power switch operable for starting the motor for driving the cutting instrument, and a control system in communication with the guard assembly for determining if the guard assembly is in the first state or the second state. In one embodiment, before the motor is started, the control system desirably automatically disables the motor if it determines that the guard assembly is in the second state. The control system may include a bypass switch operable for bypassing the control system and starting the motor when the guard assembly is in the second state.

In one embodiment, the power switch preferably has a first indicator light that is illuminated when the motor is running and that is de-activated when the motor is disabled or shut down. In one embodiment, the first indicator light may be illuminated when the operator approaches the table saw to provide an indication of the guard status of the saw. Thus, the first indicator light may be illuminated before the motor is started and remain illuminated after the motor is started to provide a continuous indication of the guard status of the saw. In one embodiment, the power switch is preferably pulled in a first direction for supplying power to the motor and may be pushed in a second opposite direction for stopping the supply of power to the motor. The power switch may also be a push on-push off switch, or any other switching mechanism well-known to those skilled in the art. In one embodiment, the bypass switch is desirably rotatable for bypassing the control system.

In one embodiment, the bypass switch desirably includes a second indicator light that is continuously illuminated when the control system determines that the guard assembly is in the second state. The second indicator light preferably blinks after the bypass switch is activated. The second indicator light preferably continues to blink after the bypass switch has been activated and while the motor is running. The bypass switch is desirably a momentary switch that may not be held in the activated position for permanently bypassing the control system. In one embodiment, a table saw having an integrated control system has only an indicator light that indicates that the guard assembly is in the second state. This particular embodiment may not have an indicator light that indicates that all of the guarding is present and that the guard assembly is in the first state.

In one embodiment, the control system preferably includes a time-out feature associated with the bypass switch, which requires the power switch to be moved into the ON position for starting the motor within a predetermined time period after activating the bypass switch. The predetermined time period is desirably between 1-30 seconds in length. In one embodiment, the predetermined time period is preferably about 10 seconds in length. In one embodiment, the integrated control system is adapted to determine whether there has been a state change in the bypass switch, whether the state of the bypass switch was just changed, or whether the bypass switch is being held in an open position or a closed position. In one embodiment, the integrated control system will not allow activation of the motor if it determines that the bypass switch is being permanently held in the open or closed position.

In one embodiment, a power tool having an integrated control system may include a workpiece supporting surface, a cutting instrument extendable above the workpiece supporting surface, a guard assembly securable above the workpiece supporting surface for covering at least a portion of the cutting instrument, the guard assembly having a first state for providing a higher level of protection and a second state for providing a lower level of protection, a motor coupled with the cutting instrument for driving the cutting instrument, and a power switch moveable in a first direction for starting the motor for driving the cutting instrument. The power tool desirably includes a control system in communication with the guard assembly for determining if the guard assembly is in the first state or the second state, whereby the control system disables the motor if an operator attempts to start the motor with the guard assembly in the second state. The control system preferably includes a bypass switch for bypassing the control system to enable starting the motor with the guard assembly in the second state.

The bypass switch is preferably a momentary bypass switch and the control system includes a time-out feature that requires the power switch to be pulled within a predetermined time period after activating the momentary bypass switch. The bypass switch is desirably moveable in a second direction, such as a rotating operation, that is different than the first direction for the power switch.

In one embodiment, the power switch preferably includes a first indicator light for indicating if the motor is running, and the bypass switch includes a second indicator light for indicating if the guard assembly is in the first state or the second state. In one embodiment, the second indicator light is desirably continuously illuminated if the guard assembly is in the second state and the motor is not running, and the second indicator light blinks after the bypass switch has been activated and while the motor is running.

In one embodiment, the power tool is preferably a table saw and the guard assembly includes a splitter and a top guard assembly securable atop the splitter. The control system desirably includes a first sensor assembly associated with the splitter for determining whether the splitter is in the first state or the second state, and a second sensor assembly associated with the top guard assembly for determining whether the top guard assembly is secured atop the splitter.

In one embodiment, a table saw having an integrated control system desirably includes a table having a top surface, a cutting blade extendable above the top surface of the table, and a guard assembly coupled with the table for covering at least a portion of the cutting blade. The guard assembly preferably has a first state for providing a higher level of protection and a second state providing a lower level of protection. The table saw desirably includes a motor coupled with the cutting blade, a power switch moveable in a first direction for starting the motor so as to drive the cutting blade, and a control system in communication with the guard assembly for determining if the guard assembly is in the first state or the second state. In one embodiment, the control system may automatically disable the motor if the motor has not yet been started and when the guard assembly is in the first state, and the control system preferably includes a bypass switch having an indicator light for providing an indication of whether the guard assembly is in the first state or the second state.

In one embodiment, the bypass switch is preferably moveable in a second direction that is different than the first direction of the power switch for bypassing the control system and starting the motor for operating the table saw when the guard assembly in the second state. In one embodiment, the bypass switch and the power switch may not be activated using the same or a simultaneous hand motion. In one embodiment, the power switch is desirably pulled for starting the motor and pushed for stopping the motor, and the bypass switch is preferably rotated for bypassing the control system and running the motor when the guard assembly is in the second state. The power switch may also be a push on-push off power switch, or have any other activation mechanism well known to those skilled in the art.

In one embodiment, a table saw having an integrated control system may include a table having a top surface, a cutting blade extendable above the top surface of the table, a motor coupled with the cutting blade, a power switch moveable in a first direction for starting the motor for driving the cutting blade, and a guard assembly covering at least a portion of the cutting blade, the guard assembly having a first state for providing a higher level of protection and a second state for providing a lower level of protection. The table saw desirably includes a control system in communication with the guard assembly for determining if the guard assembly is in the first state or the second state. The control system is preferably designed to prevent the motor from starting if it determines that the guard assembly is in the second state, and the control system desirably includes a bypass switch that is operable for bypassing the control system and starting the motor with the guard assembly in the second state.

In one embodiment, the guard assembly preferably includes a splitter, an anti kickback pawl, and a top guard assembly securable atop the splitter. The top guard assembly preferably includes a top guard and one or more side guards pivotally secured to the top guard.

The integrated control system may include a first sensor assembly in communication with the splitter for determining if the splitter is fully installed in an upright position, rotated into a low riving knife position, or decoupled from the table. The integrated control system preferably includes a second sensor assembly in communication with the top guard assembly for determining if the top guard assembly is secured atop the splitter. The integrated control system may include a third sensor for determining the presence of an anti kickback pawl. The integrated control system may include a fourth sensor for determining the rotational status of the one or more side guards.

In one embodiment, the guard assembly is in the first state when the splitter is in the fully installed upright position and the top guard assembly is secured atop the splitter. In one embodiment, the guard assembly is in the second state when the top guard assembly is not secured atop the splitter. In one embodiment, the control system desirably includes a time-out bypass switch. In one embodiment, if the bypass switch is activated, the operator preferably has a pre-determined period of time for pulling the power ON switch. If the power ON switch is not pulled within the pre-determined period of time (e.g. 10 seconds), the operator must desirably activate the bypass switch once again before the power may be turned on for the system.

In one embodiment, the control system of the present invention preferably provides a clear indication to an operator of the guarding status of the power tool as the operator approaches the tool. If any of the guarding is not present or in the proper position, one or more indicator lights will desirably illuminate to provide an indication of the guard status of the power tool to the operator.

In one embodiment, the control system of the present invention desirably provides an affirmative indication to an operator of the guard status of a power tool. In one embodiment, this is preferably accomplished by providing one or more illuminating lights observable by an operator. In one embodiment, a bypass switch preferably includes an indicator light that is continuously illuminated to alert an operator that some action must be taken before operating the power tool. Once the bypass switch has been activated, the indicator light may blink to alert the operator that the saw may now be operated with the guarding removed.

In one embodiment, the control system of the present invention preferably includes a first array of sensors associated with the top guard assembly including the top guard removable from the splitter and the side guard pivoted to the top guard. The system desirably includes a second array of sensors associated with the splitter to determine if the splitter is in the high splitter position or in the low riving knife position. The array of sensors associated with the splitter preferably detects the position of the splitter/riving knife and requires appropriate action by an operator. If the splitter is in the high splitter position, and the top guard is in place, the operator may activate the system without using the bypass switch. If the splitter is in the low riving knife position, the operator is preferably required to use the bypass switch before beginning power to the motor.

In one embodiment, the array of sensors associated with the splitter desirably prevents tampering by requiring the splitter to be fully inserted before beginning operation of the motor. In one embodiment, if an operator attempts to bypass the control system by taping over the sensors or inserting a dummy splitter against the sensors, the sensors will preferably detect that the splitter is not fully inserted and will not allow operation of the motor until the bypass switch is activated.

These and other preferred embodiments of the present invention will be described in more detail below.

BRIEF DESCRIPTION OF THE DRAWINGS

FIGS. 19A-19G show an indicator panel for an integrated control system, in accordance with one embodiment of the present invention.

FIGS. 20A-20C show an indicator panel for an integrated control system, in accordance with one embodiment of the present invention.

FIGS. 21A-21C show an indicator panel for an integrated control system, in accordance with one embodiment of the present invention.

DETAILED DESCRIPTION

Figure 1:
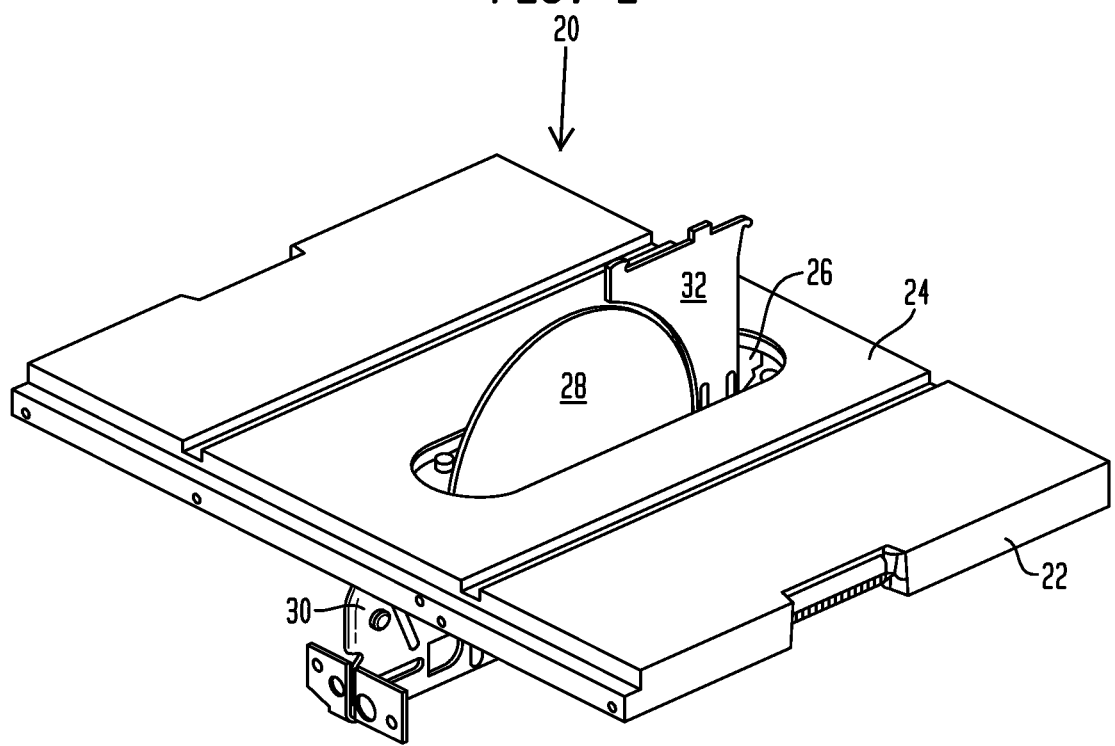
FIG. 1 shows a perspective view of a table saw including a cutting blade and a splitter, in accordance with one embodiment of the present invention.

Referring to FIG. 1, in one embodiment, a table saw 20 preferably includes a table 22 with a top surface 24 adapted to support a workpiece during a cutting operation. The table 22 desirably includes an aperture 26 that extends through the table 22 and a rotatable saw blade 28 that projects through the aperture for cutting a workpiece. The saw blade 28 is preferably coupled with a motor (not shown) and a carriage 30 that are preferably located below the table 22.

The table saw 20 preferably includes a splitter 32 also referred to as a riving knife 32 that extends through the aperture 26 and projects upwardly from the top surface 24 of the table 22. In one embodiment, the splitter 32 is preferably formed from a flat plate that extends through the aperture 26 in the table 22. A lower end of the splitter 32 may be mounted to the carriage 30 of the table saw 20 so that it is aligned with the saw blade 28. In one embodiment, the splitter 32 is desirably mounted on the carriage 30 for movement in conjunction with the saw blade 28.

In one embodiment, as a workpiece is cut by the saw blade 28, the splitter 32 desirably maintains the cut portions of the workpiece (not shown) spaced from one another as the remainder of the workpiece is fed through the saw blade 28, and prevents the stock that may bind between the blade and the fence from getting caught by the teeth on the back of the blade. As is well known to those skilled in the art, keeping the cut portions of the workpiece separated helps to prevent potential binding of the workpiece with the saw blade 28 during a cutting operation, which minimizes the possibility of kick back of the workpiece.

Figure 2:
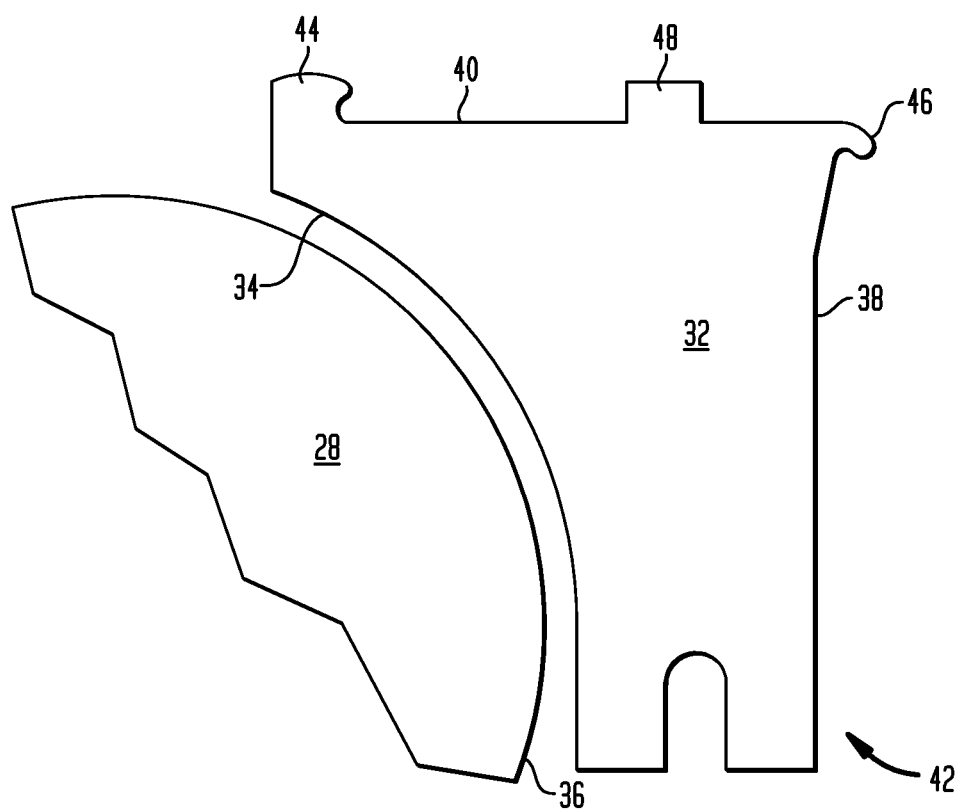
FIG. 2 shows a fragmentary side view of the cutting blade and the splitter of FIG. 1.

Referring to FIG. 2, the splitter 32 preferably has a leading edge 34 that defines a concave surface having a radius that is slightly larger than the radius of the saw blade 28 and is preferably spaced from and conforms to the outer edge 36 of the saw blade 28. In one embodiment, the spacing between the leading edge 34 of the splitter 32 and the saw blade 28 may range from about 3 mm (0.12 inches) to 8 mm (0.31 inches). The concave shape of the leading edge 34 of the splitter 32 preferably enables the splitter to substantially surround the rear portion 36 of the saw blade 28 while the saw blade is rotating to provide protection for the user against accidental contact between the user and the saw blade.

Referring to FIG. 2, in one embodiment, the splitter 32 may include the leading edge 34, a trailing edge 38, an upper end 40, and a lower end 42. The upper end 40 preferably includes a first anchor point 44 or first anchor 44 adjacent the leading end of the splitter 32 and a second anchor point 46 or second anchor 46 adjacent the trailing end 38 of the splitter. The first anchor 44 preferably includes a hook that projects rearward from the top edge 40 of the splitter 32. The second anchor 46 preferably includes a hook that projects downwardly from the trailing edge 38 of the splitter. The first and second anchors 44, 46 preferably project in directions that prevent the top guard from inadvertently moving toward the saw blade 28. The upper end 40 also desirably includes a stabilizing flange 48 projecting therefrom. The lower end 42 of the splitter 32 is preferably adapted to be secured to the support carriage 30 (FIG. 1) located below the top surface 24 of the table 22.

Figure 3:
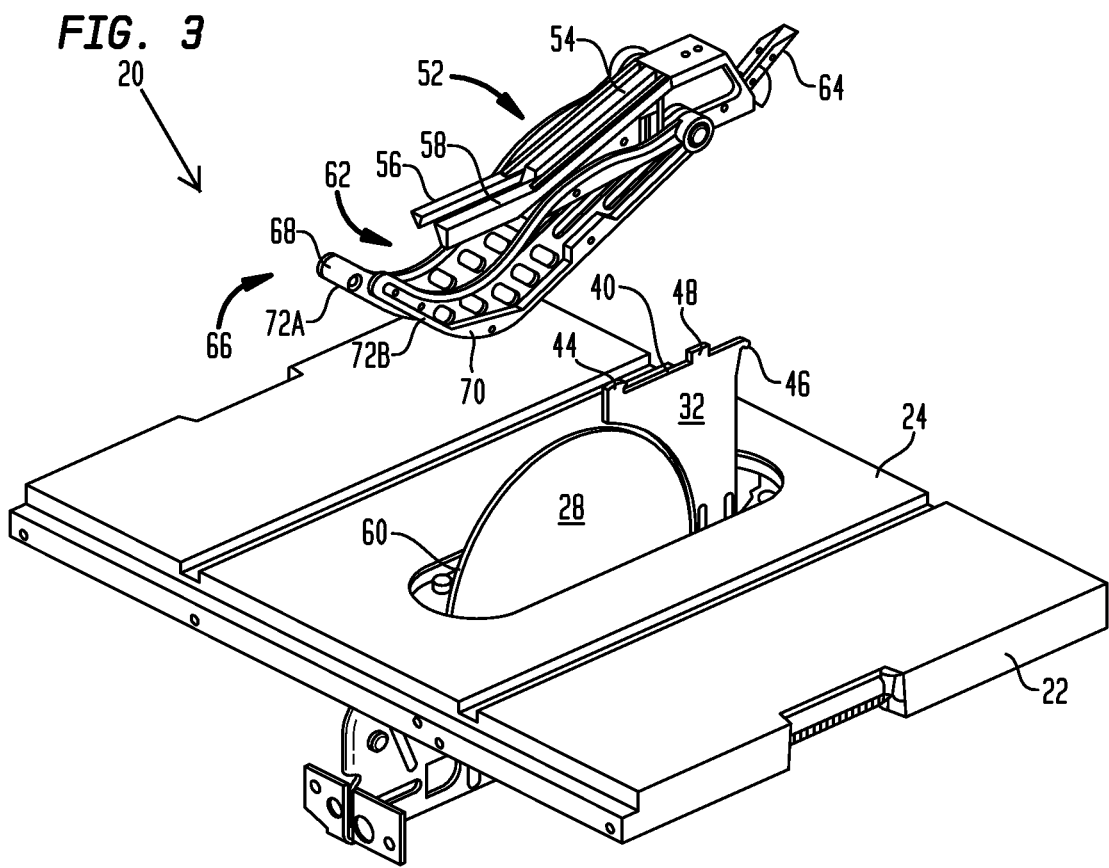
FIG. 3 shows the table saw of FIG. 1 and a top guard assembly securable atop the splitter.

Referring to FIG. 3, in one embodiment, the table saw 20 desirably includes a guard assembly that includes a splitter 32 and a top guard assembly 52 that is attachable to the splitter 32 to prevent an operator from contacting the saw blade 28 during a cutting operation. The top guard assembly 52 may include a top guard 54 attachable to the upper end 40 of the splitter 32. The top guard 54 desirably has a first finger 56 and a second finger 58 that each extend forward from the point of contact between the top guard 54 and the splitter 32. The two fingers 56, 58 are adapted to extend beyond a leading edge 60 of the saw blade 28 to prevent an operator from contacting the saw blade 28. The two fingers 56, 58 are preferably spaced from each other to form a gap 62 therebetween that provides an unobstructed view of the saw blade 28 and workpieces being cut by the saw blade 28. The gap 62 between the fingers 56, 58 may also provide the operator with a view of alignment markings (not shown) on the workpiece to allow the user to precisely cut the workpiece using the saw blade 28.

In one embodiment, the fingers 56, 58 preferably have interior chamfered edges extending along a portion of their length. The chamfered edges desirably increase the view of the cutting zone.

The top guard assembly 52 also preferably includes a latch 64 that is pivotally attached to the top guard 54 for securing the top guard assembly 52 to the splitter 32. An underside of the top guard 54 preferably includes grooves (not shown) adapted to engage the first anchor point 44 and the stabilizing flange 48 for securing the top guard 54 atop the splitter 32. After the top guard 54 has been positioned atop the splitter 32, the latch 64 may be pivoted downwardly into a locking position for engaging the second anchor point 46 and locking the top guard assembly 52 atop the splitter 32. In one embodiment, the latch may be an over-center latch that is designed to project above or stand up over the top of the top guard 54 to provide a clear visual indication that the latch is not locked.

The top guard assembly 52 also preferably includes a side guard 66 that is pivotably mounted to the top guard 54. The side guard 66 desirably provides a protective surface that surrounds the front and the sides of the exposed portion of the saw blade 28. The side guard 66 preferably has a left arm 68 and a right arm 70, each extending beyond the fingers 56, 58 of the top guard 54. The left and right arms 68, 70 desirably provide protection from the saw blade 28. Likewise, each of the left and right arms 68, 70 desirably has a front portion 72A, 72B that may contact an operators hands or fingers positioned on top of the workpiece as it is fed to be cut, thus providing a tactile warning that the operator's hands or fingers may be near the saw blade 28. The left and right arms 68, 70 are preferably pivotally mounted to the top guard 54 and are adapted to pivot so as to not interfere with measuring, aligning, or cutting the workpiece.

In one embodiment, the side guard 66 may include a sensing apparatus that provides an audible or visual signal if the user contacts the side guard 66 when the saw blade 28 is rotating. The audible signal may be a bell or an alarm. The visual signal may be a warning light. In one embodiment, the saw blade 28 may stop rotating when the user contacts the side guard 66. This sensing mechanism may be activated based on a change in capacitance sensed by the side guard 66, or by another type of sensing means that is well-known to those of ordinary skill in the art.

Each of the left and right arms 68, 70 of the side guard 66 may be independently lifted and rotated relative to the top surface 24 of the table 22 and the top guard 54. The top guard 54 desirably remains stationary as the left and right arms 68, 70 of the side guard 66 are rotated and pivoted from their lowered positions. Providing a two-piece side guard having arms 68, 70 that move independently of one another preferably allows a further range of potential tilt of the saw blade 28 with respect to the top surface 24 of the table 22 without requiring the side guard 66 to be removed. Moreover, the side guard 66, with independently moveable arms 68, 70, may be used with a workpiece that does not have a flat surface or that is not parallel to the top surface 24. As a result, an operator may be less likely to remove the side guard 66 before commencing a cutting operation. Additionally, the side guard 66 desirably provides additional protection to the user because a greater area on the side and front surfaces of the saw blade 28 may be enclosed by the side guard during angled cuts (or when cutting workpieces with angled surfaces). In addition, a greater area around the saw blade is preferably covered than would be available with a side guard having arms that are attached together on either side of the saw blade.

Figure 4:
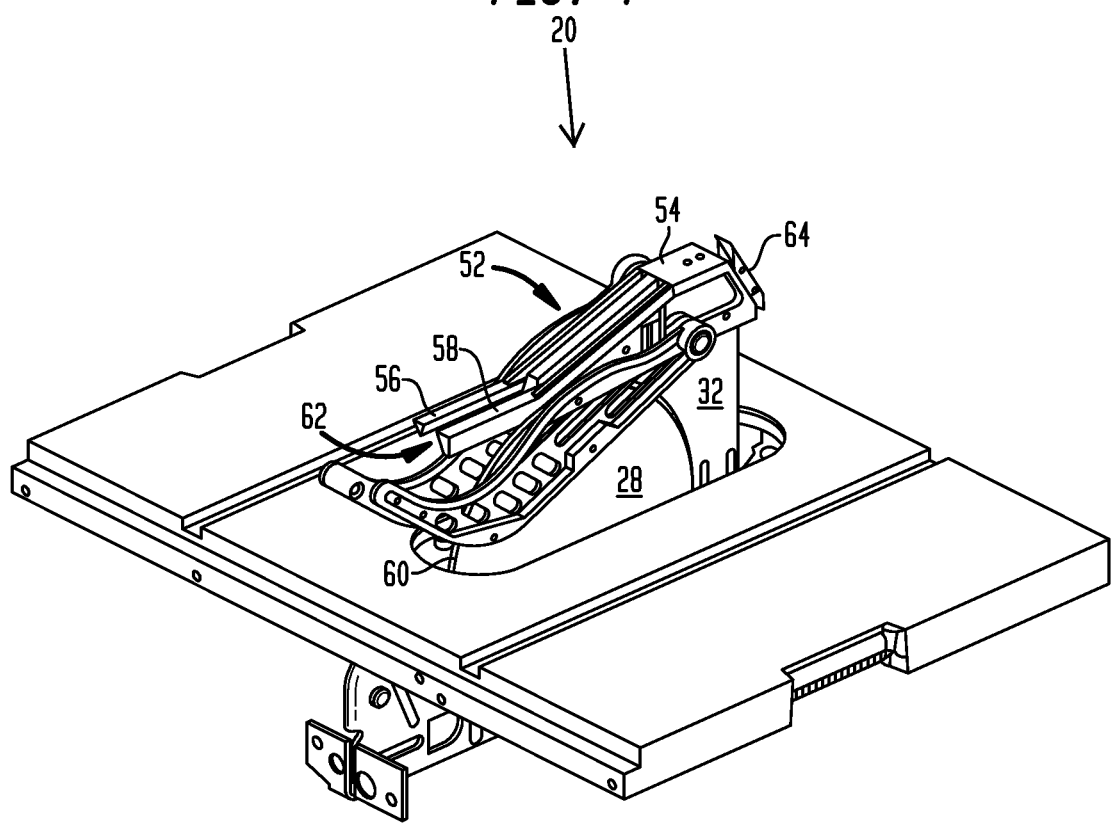
FIG. 4 shows the top guard assembly of FIG. 3 secured atop the splitter for covering the cutting blade.

FIG. 4 shows the table saw 20 after the top guard assembly 52 has been secured atop the splitter 32. In FIG. 4, the latch 64 is in the locked position for locking the top guard assembly 52 in place atop the splitter 32. With the top guard assembly 52 locked in place, the top guard 54 includes the first finger 56 and the second finger 58 that each extend above the saw blade 28. The first and second fingers 56, 58 preferably extend forward from the splitter 32 to cover the top and front of the saw blade 28. The fingers 56, 58 are desirably separated from each other by the gap 62 that allows the user to view the rotating saw blade 28 and feeding of the workpiece against the leading cutting edge 60 of the saw blade 28.

As noted above, the bottom surface (not shown) of the top guard 54 preferably includes one or more grooves, adapted to receive the anchors and the stabilizing flange projecting from the upper end when the top guard 54 is secured atop the riving knife 32.

Figure 5:
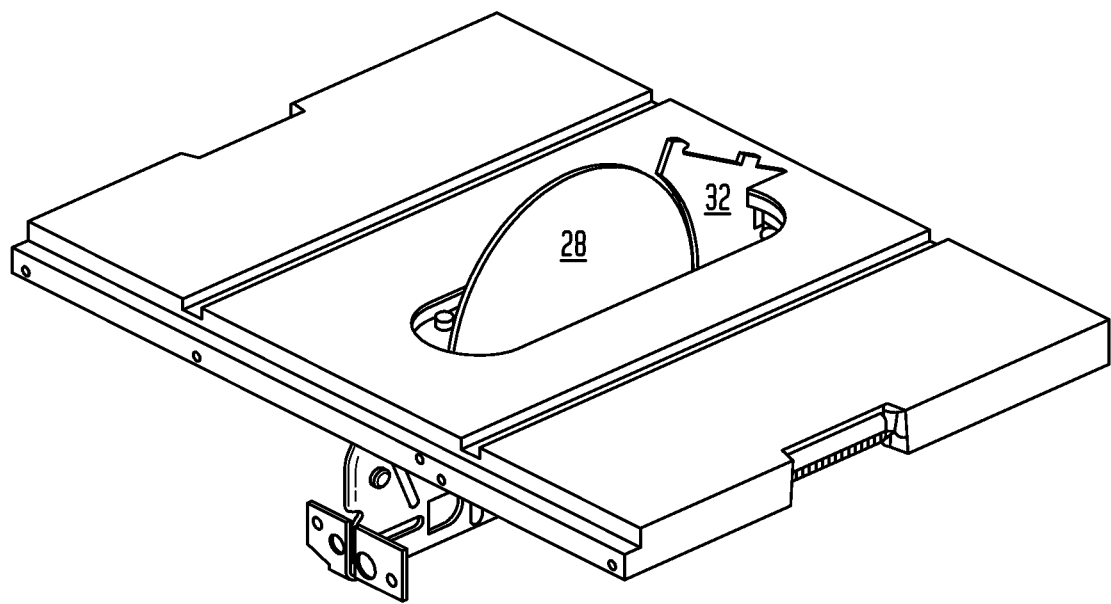
FIG. 5 shows the table saw of FIG. 1 with the splitter rotated downwardly and into a low riving knife position.

In order to make certain cuts in workpieces, it may be necessary to remove the guard assembly and move the splitter 32 into a low riving knife position shown in FIG. 5. In one embodiment, movement of the splitter may involve rotational and/or translational motion. In one embodiment, it may be necessary to remove the top guard assembly 52 and rotate the splitter 32 into a low riving knife position when making a cut in which the top of the cutting blade 28 does not protrude from the top surface of the workpiece. For certain cuts, it may be necessary to completely remove the splitter 32. After these cuts have been made, operators are advised to reinstall the splitter 32 and the top guard assembly 52 to the configuration shown in FIG. 4. Unfortunately, this is not done in all instances because there is little performance incentive to do so. Operating with all of the guarding components in place as shown in FIG. 4 is preferred.

In one embodiment, a table saw has a guard control system integrated therein that preferably temporarily shuts down the saw from further operation or that preferably requires activation of a bypass switch prior to starting the motor if any of the guarding components (e.g. the riving knife and/or the guard assembly) are missing, or if the guarding components are adjusted into a compromised position. The control system may include one or more sensors for detecting if any of the guarding components are missing or if any of the guarding components are not properly assembled atop the cutting saw. The sensing may be accomplished in various ways including radio frequency identification, magnetic sensing, capacitive sensing, mechanical switches, or electrical contacts. In one embodiment, the control system desirably includes an electrical circuit having a resistive value method that prevents tampering with the circuit.

Figure 6A:
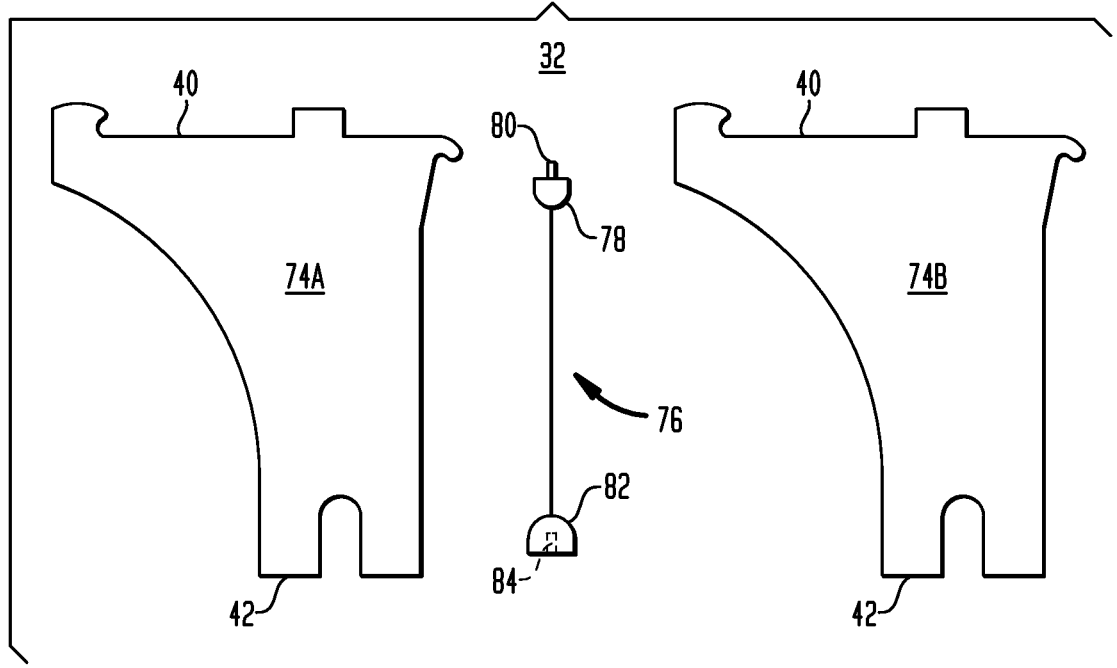
FIG. 6A shows an exploded view of a splitter, in accordance with one embodiment of the present invention.
Figure 6B:
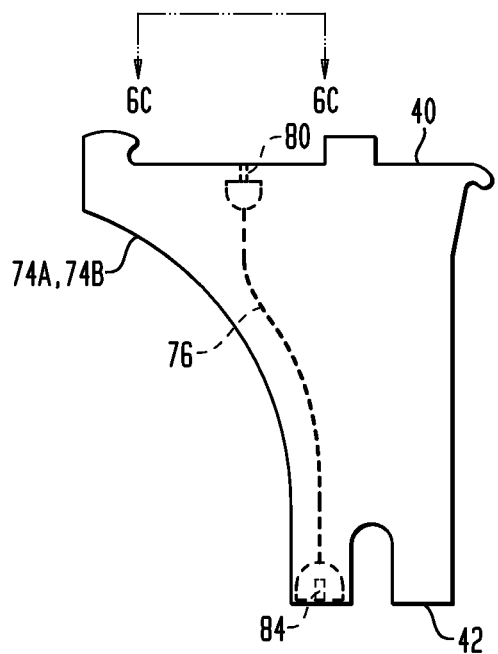
FIG. 6B shows the splitter of FIG. 6A after assembly.

Referring to FIGS. 6A and 6B, in one embodiment, a table saw preferably has a control system including one or more sensing components integrated into the splitter 32. Referring to FIG. 6A, in one embodiment, the splitter 32 preferably includes a first plate 74A and a second plate 74B. The first and second plates 74A, 74B preferably have the same shape and dimensions. The plates, 74A, 74B may be made of metal or other well-known, durable materials. The splitter 32 desirably includes a conductive element 76 that is adapted to be laminated between the first and second plates 74A, 74B. The conductive element 76 desirably includes an upper end 78 having a male connector 80 projecting therefrom and a lower end 82 having a female connector 84 formed therein. The conductive element 76 is preferably positioned between the first and second plates 74A, 74B for providing a signal transmission path between the upper ends 40 and the lower ends 42 of the respective first and second plates 74A, 74B.

FIG. 6B shows the first and second plates 74A, 74B assembled together with the conductive element 76 disposed between the plates. The male connector 80 is preferably accessible at the upper end 40 of the splitter 32 and the female connector 84 is preferably accessible at the lower end 42 of the splitter 32.

Figure 6C:
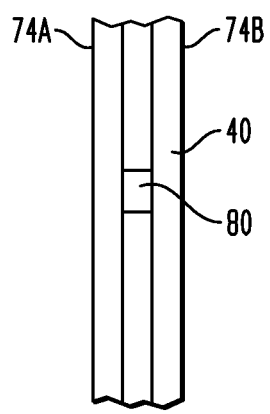
FIG. 6C shows a top view of the splitter of FIG. 6B along line 6C-6C.

Referring to FIGS. 6B and 6C, in one embodiment, the upper end of the male connector 80 is preferably accessible between the first and second plates 74A, 74B. The uppermost end of the male connector 80 is preferably slightly recessed within the splitter 32 so that it remains protected below the top surface 40 of the splitter 32 when the top guard 54 is removed and the upper end 40 of the splitter 32 is exposed. In one embodiment, the electrical connection below the table surface is preferably a male connector that engages the female connector 84 at the lower end 82 of the conductive element 76. Providing a male connector below the table surface that is adapted to receive the female connector 84 at the lower end 42 of the splitter 32 minimizes the likelihood of saw dust contamination or the packing of dust about the connector parts.

In one embodiment, the first and second plates 74A, 74B may be secured together such as by being glued together. In other embodiments, the first and second plates 74A, 74B may be assembled together using alternative methods such as riveting, welding, or integrating simple appendage and socket pairs across the respective plates 74A, 74B that structurally interlock with one another. In one embodiment, the splitter 32 is preferably a single plate having a channel formed between upper and lower ends thereof that is adapted to accommodate a conductive element therein for transmitting signals through the splitter.

In one embodiment, a table saw may include two distinct splitter assemblies that may be secured to the saw. The first splitter is desirably used during normal cuts and includes all of the guarding components shown and described above in FIGS. 3 and 4. In one embodiment, the top guard is permanently connected to the upper end of the splitter. The second splitter is preferably adapted to be used for shallow cuts and does not include the guard assembly including the top guard 54 and the side guard 66. When making cuts using the second splitter, a bypass operation is desirably required before the cutting blade will rotate. In one embodiment, the first splitter desirably has no electrical connections or sensors for determining if the top guard is in place because the top guard is permanently secured to the splitter. The first splitter preferably has a key or sensors that enable the integrated control system to determine whether the first splitter is installed. In one embodiment, the second splitter may be used as a riving knife and has a unique key that is different than the first splitter so that the integrated control system may determine when the second splitter is installed and recognize the difference between the first splitter and the second splitter. Although this embodiment having two splitters is not limited by any particular theory of operation, it is believed that this particular embodiment eliminates the need for a user-connectable electrical connection at the top of the splitter.

Figure 7A:
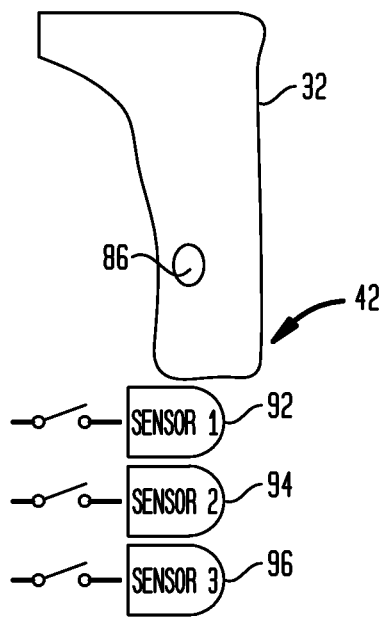
FIGS. 7A-7C show a splitter and an array of sensors adapted for communicating with the splitter, in accordance with one embodiment of the present invention.
Figure 7B:
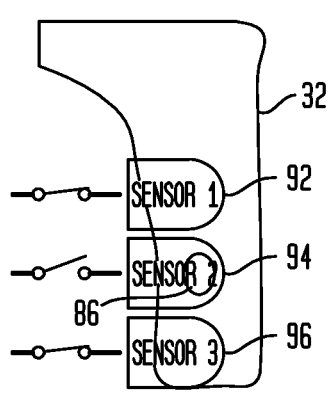

Referring to FIG. 7A, in one embodiment, the splitter 32 preferably has an aperture 86 formed therein. The lower end 42 of the splitter 32 is adapted to be secured in the carriage 30 located below the table (not shown). In one embodiment, the carriage desirably includes a first sensor 92, a second sensor 94 and a third sensor 96. In one embodiment, when the splitter 32 is not fully installed in the carriage (FIG. 7A), the three sensors 92, 94, 96 are preferably open and the control system will recognize that the splitter is not installed. Referring to FIG. 7B, when the splitter 32 is properly seated in the carriage, the first sensor 92 and the third sensor 96 are closed. In addition, the aperture 86 is aligned with the second sensor 92 so that the second sensor 94 remains open. When the control system recognizes the first sensor 92 is closed, that the second sensor 94 is open and that the third sensor 96 is closed, the control system preferably recognizes that the splitter 32 is properly installed in the carriage 30. If the control system recognizes that the splitter is not fully installed as shown in FIG. 7A, the control system desirably recognizes that all of the guarding components are not completely installed and may prevent starting of the motor and/or shut down the table saw until bypass occurs.

Figure 7C:
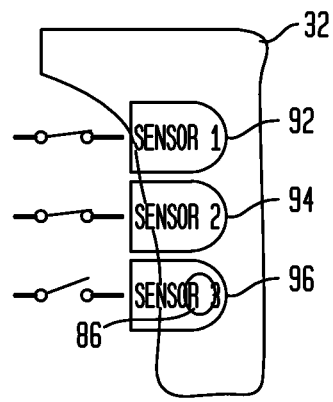

In one embodiment, when the splitter 32 is moved into the low riving knife position shown in FIG. 7C, the aperture 86 is aligned with the third sensor 96 so that the first sensor 92 and the second sensor 94 are closed, and the third sensor 96 is open. In the position shown in FIG. 7C, the control system will desirably indicate that all of the guarding is not present and the table saw may only be started using the bypass protocols described herein.

Figure 8:
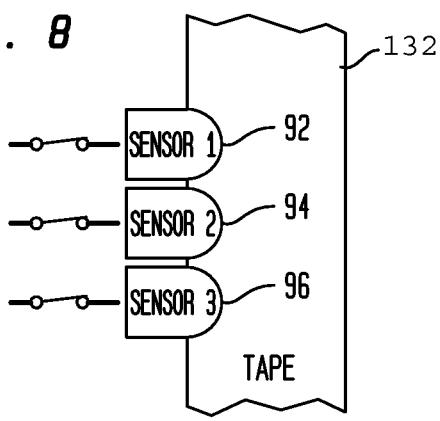
FIG. 8 shows a method of attempting to override the integrated control system of the present invention.

Referring to FIG. 8, in one embodiment, the control system preferably incorporates an anti-tamper design that may not be permanently bypassed by inserting a dummy splitter in the carriage. As shown in FIG. 8, if a dummy splitter 132 is inserted to rig the control system, all of the sensors 92, 94, 96 will be in the closed position and the system will recognize that the splitter 32 (FIG. 7B) is not properly installed.

Figure 9:
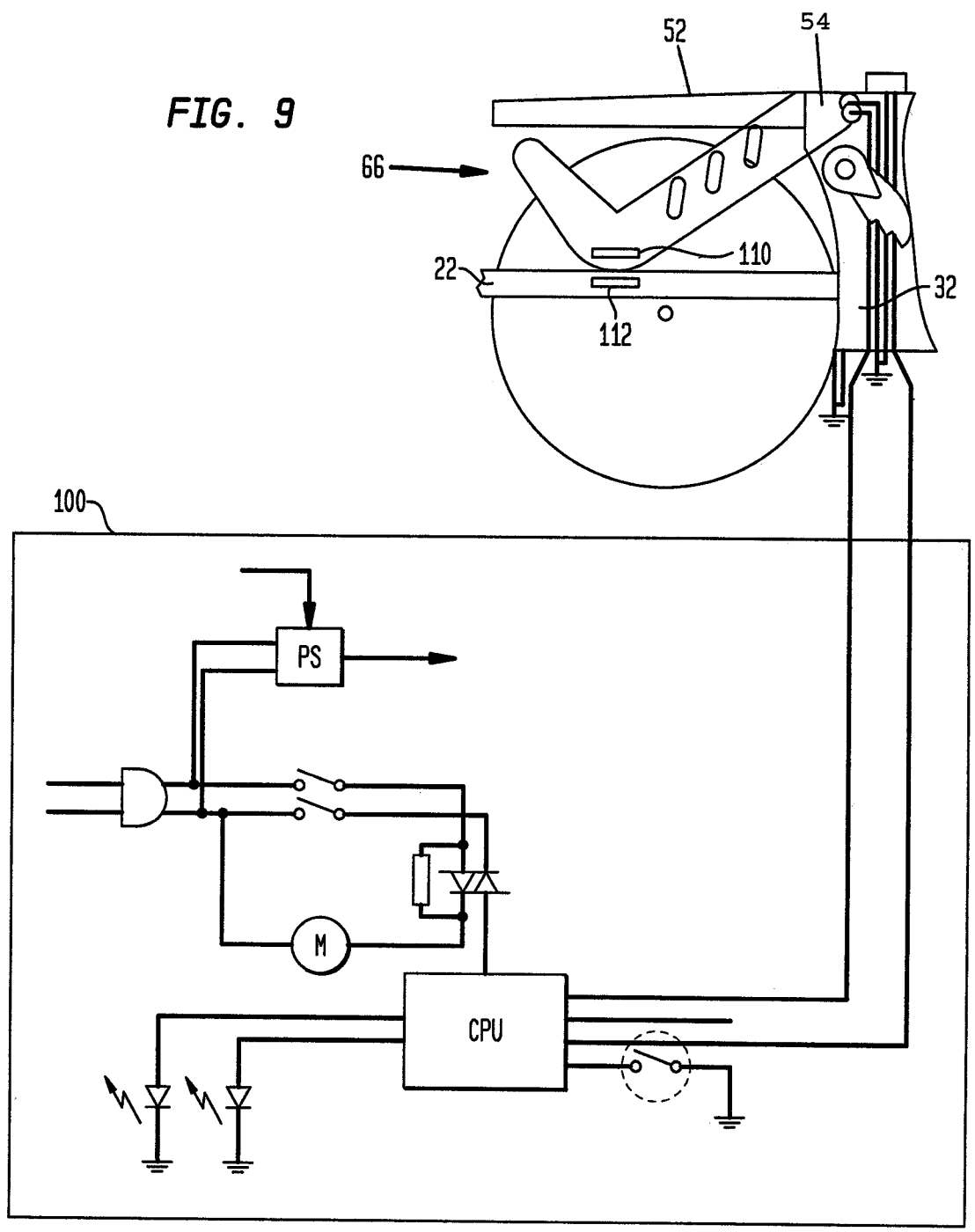
FIG. 9 shows a schematic view of a circuit for integrating a guard assembly into a table saw, in accordance with one embodiment of the present invention.

Referring to FIG. 9, in one embodiment, a control system 100 is preferably interconnected with the riving knife 32 and the top guard assembly 52 including the top guard 54 and the side guard 66. The control system 100 desirably forms a control circuit that determines if the riving knife 32 and the top guard assembly 52 are properly assembled over the saw blade 28. If the top guard assembly 52 or the riving knife 32 are not in place or properly secured atop the table saw, or if the side guard 66 is elevated before starting the table saw, the control system will desirably recognize the deficiency and generate appropriate response signals as will be described in more detail below.

Referring to FIG. 9, in one embodiment, the side guard 66 preferably has at least one sensor 110 provided therein and the table 22 has a sensor 102 provided therein. The sensors may be contact sensors. When the side guard 66 is lowered, the sensor 110 in the side guard 66 is desirably read by the sensor 112 in the table 22 to indicate that the side guard is in a lowered position. If the side guard 66 is in an elevated position when the operator attempts to start the table saw, the sensor 112 will preferably detect that the sensor 110 has been lifted and the motor will not start unless a bypass protocol is followed. In one embodiment, the sensors may be provided between the side guard and the top guard to determine the rotational angle of the side guard. The control system may use information such as the tilt angle of the saw blade and the blade height of the saw blade when determining whether the rotational angle of the side guard is acceptable for starting the motor or whether the bypass protocol must be followed before starting the motor.

Figure 10:
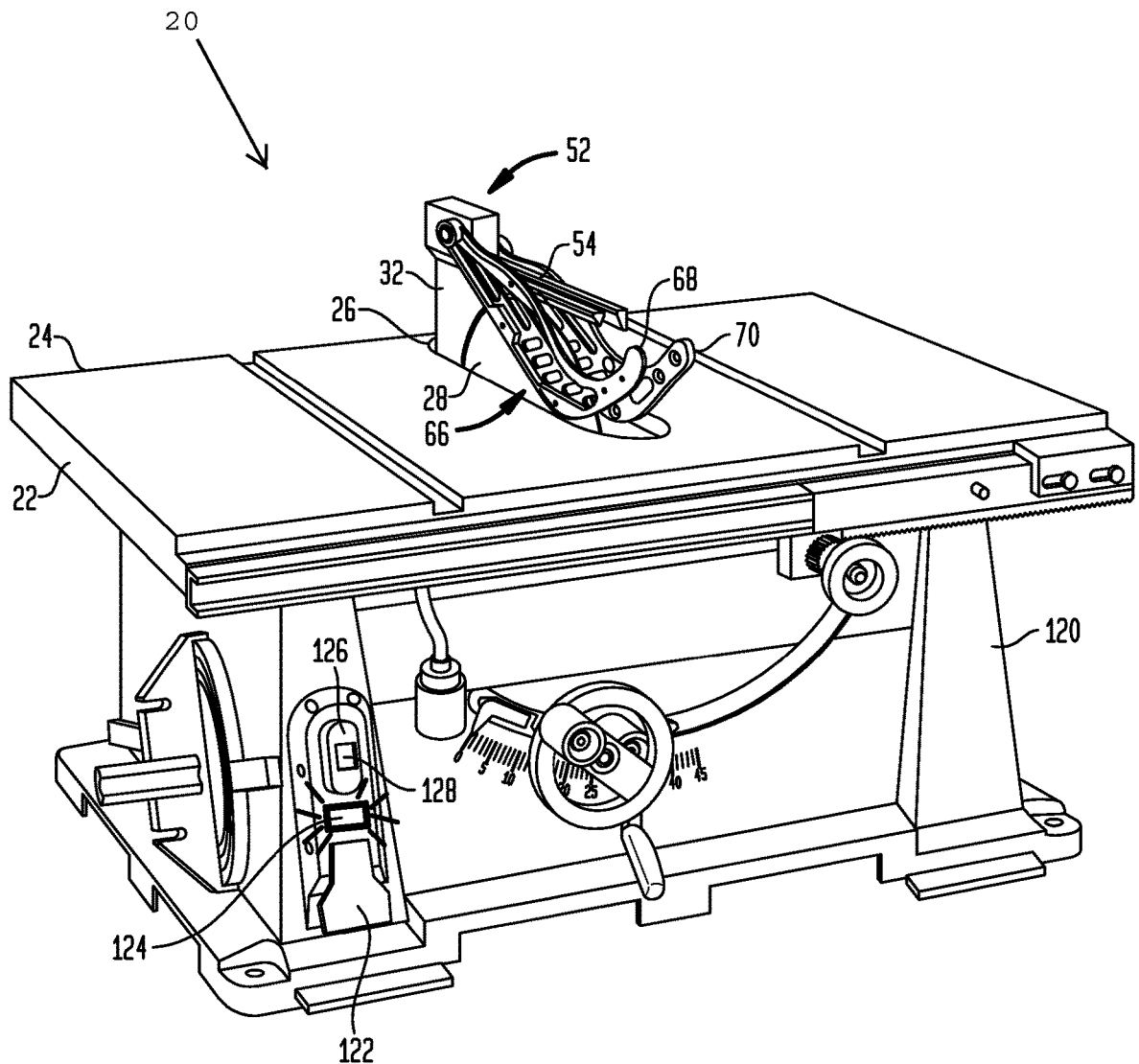
FIG. 10 shows a perspective view of a table saw having an integrated guard system, in accordance with one embodiment of the present invention.

FIG. 10 shows one embodiment of the present invention in which a control system, such as one or more features of the control system shown and described in herein, is integrated into a table saw. Referring to FIG. 10, the table saw 20 preferably includes table 22 having a top surface 24 and a saw blade 28 projecting through an aperture 26 in the table 22. In FIG. 10, the splitter 32 is preferably aligned with the trailing end of the saw blade 28 and the top guard assembly 52 is secured atop the splitter 32. The top guard assembly 52 desirably includes the top guard 54 and the side guard 66 pivotally secured to the top guard 54.

The table saw 20 preferably includes a base 120 that supports the table 22 and that has various control elements provided thereon. In one embodiment, the table saw 20 desirably includes an ON/OFF power switch 122 that may be pulled up and away from the base 120 for turning the motor of the table saw ON, and that is preferably depressed for turning the motor of the table saw OFF. The table saw 20 preferably includes a first indicator light 124 that is desirably illuminated when all of the guarding components have been properly assembled over the saw blade 28. In one embodiment, the first indicator light 124 is green. When the splitter 32 and the top guard assembly 52 including the top guard 54 and the side guard 66 have been properly assembled over the cutting blade, the control system preferably recognizes that all of the guarding components are property installed. In response, the first indicator light 124 may be illuminated and the motor of the table saw may be started for rotating the cutting blade.

The table saw 20 also desirably includes a bypass switch 126 that is rotatable in a clockwise direction for bypassing the control system and operating the table saw when one or more of the guarding components are removed or not properly installed. The bypass switch 126 may include a second indicator light 128 that may be activated to illuminate continuous light or a blinking light. In one embodiment, the second indicator light 128 is yellow.

The control system desirably includes one or more control programs or routines stored therein. The control system may include a central processing unit (CPU) having one or more microprocessors or analog controls and one or more memory devices for storing the programs/routines, analyzing information about the guard status of the system, providing an indication of the guard status to an operator, and operating the table saw. In one embodiment, the table saw 20 is plugged into an outlet so that power is provided to the table saw. All of the guarding components of the assembly including the riving knife 32, the top guard 54 and the side guard 66 are in place. The power switch 122 is in the OFF position and the motor for the table saw is supplied with power and ready for activation. In this configuration, the first indicator light 124 is illuminated and the second indicator light 128 is not illuminated. In a next step, the operator pulls on the power switch 122 to start the motor and rotate the saw blade 28. Because all of the guards are properly assembled and in place, the motor rotates the saw blade 28 as the first indicator light 124 remains illuminated and the second indicator light 128 is not illuminated. During operation, the left and right arms 68, 70 of the side guard 66 may be pivoted up and away from the top surface 24 of the table 22 as the work piece is pushed through the cutting blade 28. During this cutting operation, the first indicator light 124 remains illuminated and the second indicator light 128 remains darkened. After the workpiece has been completely cut, the operator pushes the power switch 122 to the OFF position so that the motor stops and the cutting blade 28 stops rotating.

Figure 11:
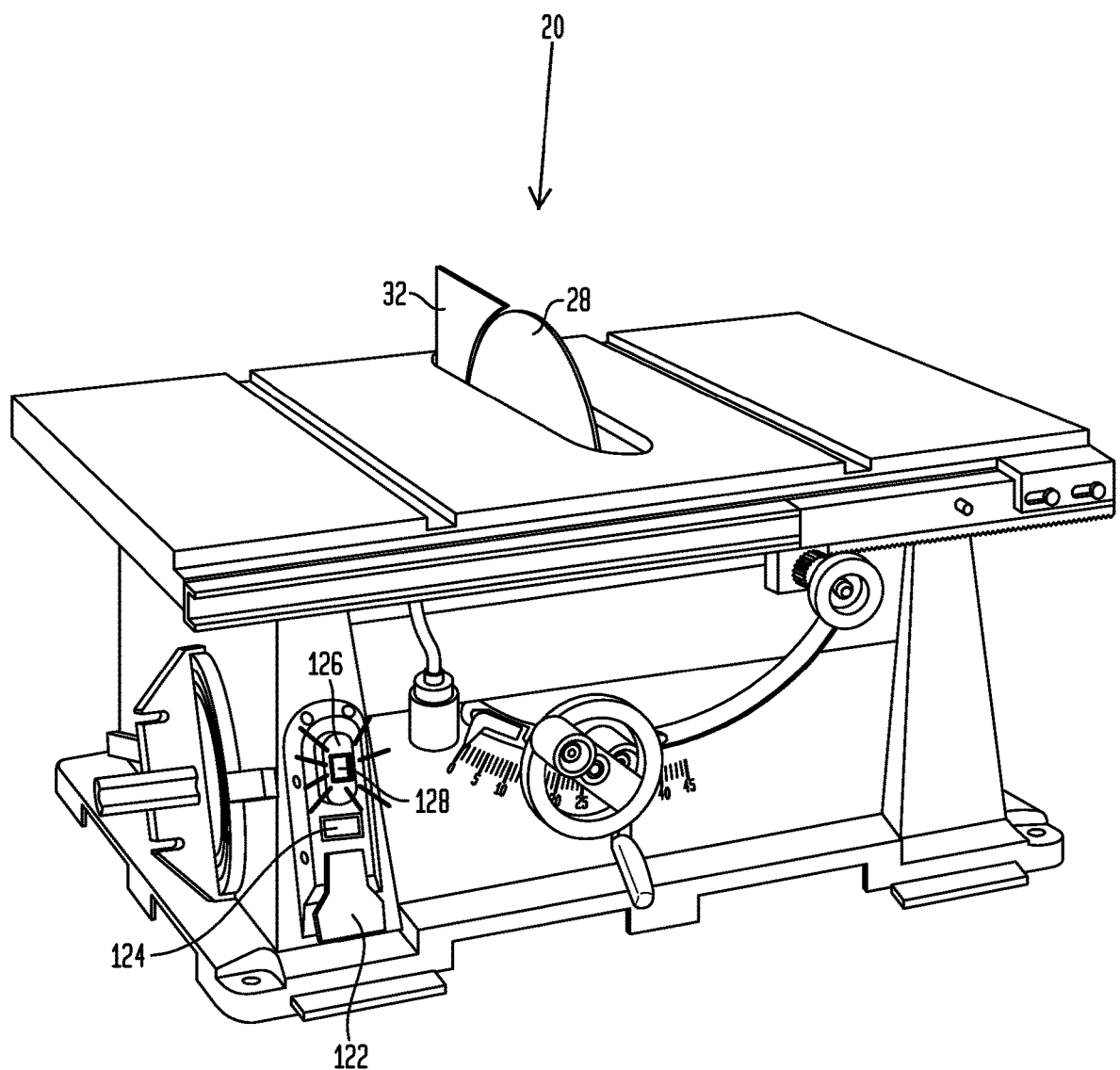
FIG. 11 shows the table saw of FIG. 10 after a guard assembly has been removed.

Referring FIG. 11, if the top guard assembly 52 (FIG. 10) is removed so that only the splitter 32 remains in place, the control system will desirably recognize that guarding has been removed and will de-activate the first indicator light 124 and illuminate the second indicator light 128. In one embodiment, the second indicator light 128 may blink once to draw the operator's attention before remaining continuously illuminated. The continuous illumination of the second indicator light 128 preferably provides the operator with an indication that one or more of the guarding components are not in place. This feature may be useful in instances where an operator approaches the table saw for the first time and seeks to determine why the saw motor will not start. At this stage, the operator cannot start the motor and rotate the cutting blade 28 by simply pulling the power switch 122 to the ON position. Before the motor will start, the operator must rotate the bypass switch 126 to the position shown in FIG. 12. Once a knob of the bypass switch 126 has been rotated to the position shown in FIG. 12, the second indicator light 128 will blink, while the first indicator light 124 is not illuminated. After the bypass switch has been activated, the operator is required to pull the power switch 122 to the ON position for starting the motor and rotating the cutting blade 28. In one embodiment, upon activating the bypass switch 126, a timer preferably limits the time between rotating the bypass switch 126 and pulling the power switch 122 to the ON position for starting the motor. If the motor is not started within the predetermined time period (e.g. 10 seconds), the second indicator light 128 on the bypass switch will desirably remain illuminated and the operator will be required to reactivate the bypass switch 126 once again before the saw may be started, Once again, the operator may be required to pull the power switch 122 within the predetermined time period of rotation of the bypass switch. In one embodiment, the bypass switch 126 is a momentary switch that may not be permanently held in the bypass position.

Figure 12:
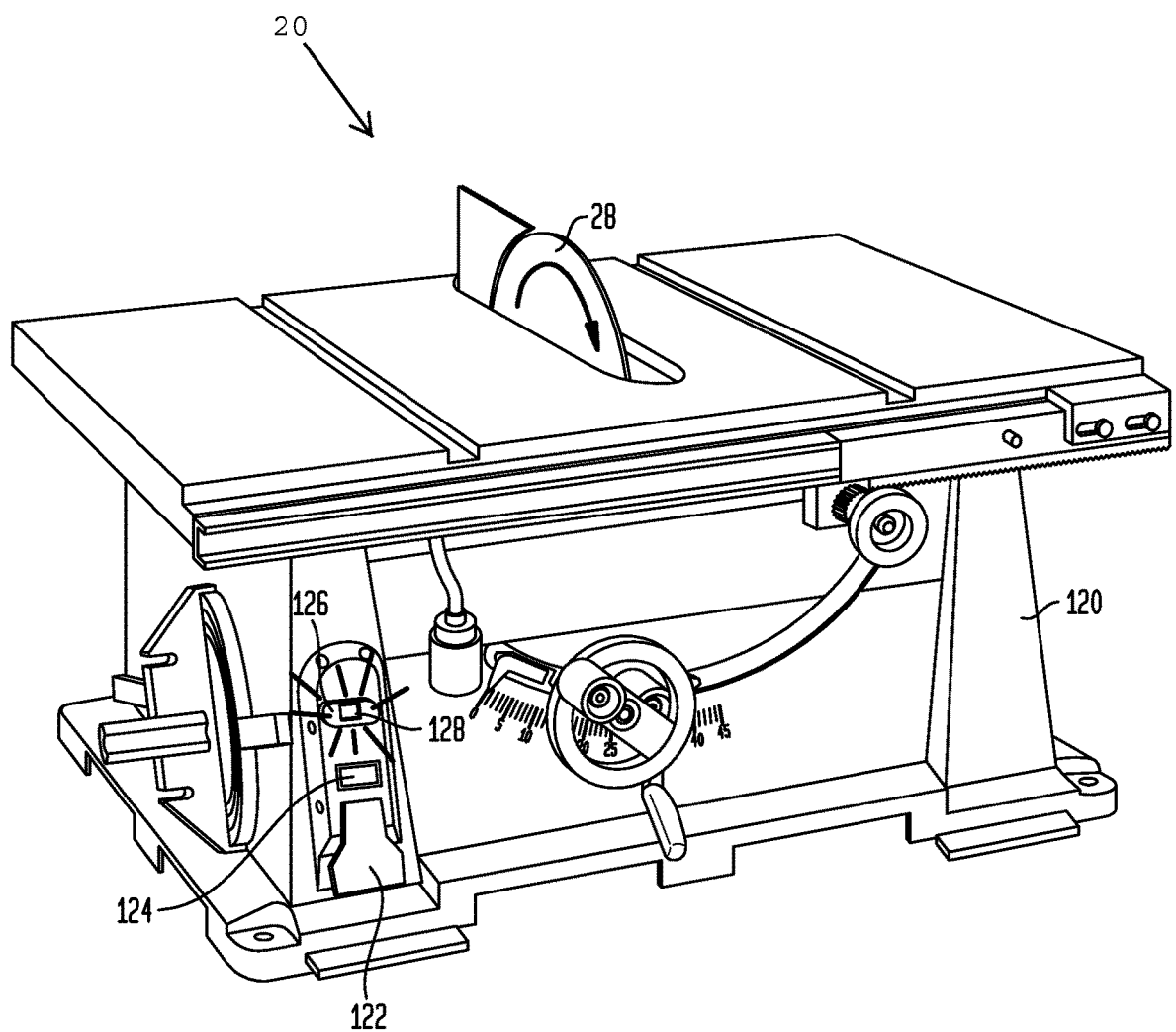
FIG. 12 shows the table saw of FIG. 11 after a bypass switch has been activated for operating the table saw with at least one of the components of the guard assembly removed.

After the bypass switch 126 has been rotated in a clockwise direction as shown in FIG. 12, the operator may pull the power switch 122 for turning the motor ON. In this condition, the first indicator light 124 is preferably de-activated and the second indicator light 128 blinks. The blinking light preferably reminds the operator and others in the vicinity of the table saw 20 that one or more components of the guard assembly are missing, disabled, or not properly assembled over the cutting blade 28. In one embodiment, the second indicator light desirably remains blinking as the saw is operated. In one embodiment, the second indicator light remains continuously illuminated as the saw is operated. At the end of a cutting operation, the operator may push the power switch 122 into the OFF position to stop the motor and the rotation of the cutting blade 28. At this stage, the first indicator light 124 desirably remains de-activated and the second indicator light 128 changes from blinking to remaining illuminated at all times.

In one embodiment, the control system is desirably programmed to ensure that the activation of the bypass switch 126 cannot be performed simultaneously with starting the motor. This may be achieved by spacing the power switch 122 from the bypass switch 126 beyond the reach of a normal human hand. In one embodiment, this is preferably achieved by requiring a motion for the bypass switch that may not be done in concert with the motion required for pulling the power switch 122 to the ON position. In one embodiment, this requires the bypass switch 126 to be rotated and the power switch 122 to be pulled into the ON position. In one embodiment, the bypass switch 126 and the power ON switch 122 are both placed on the same side of the base 120 and within reach of an operator's hand so that the operator's other hand may support a workpiece.

Figure 13:
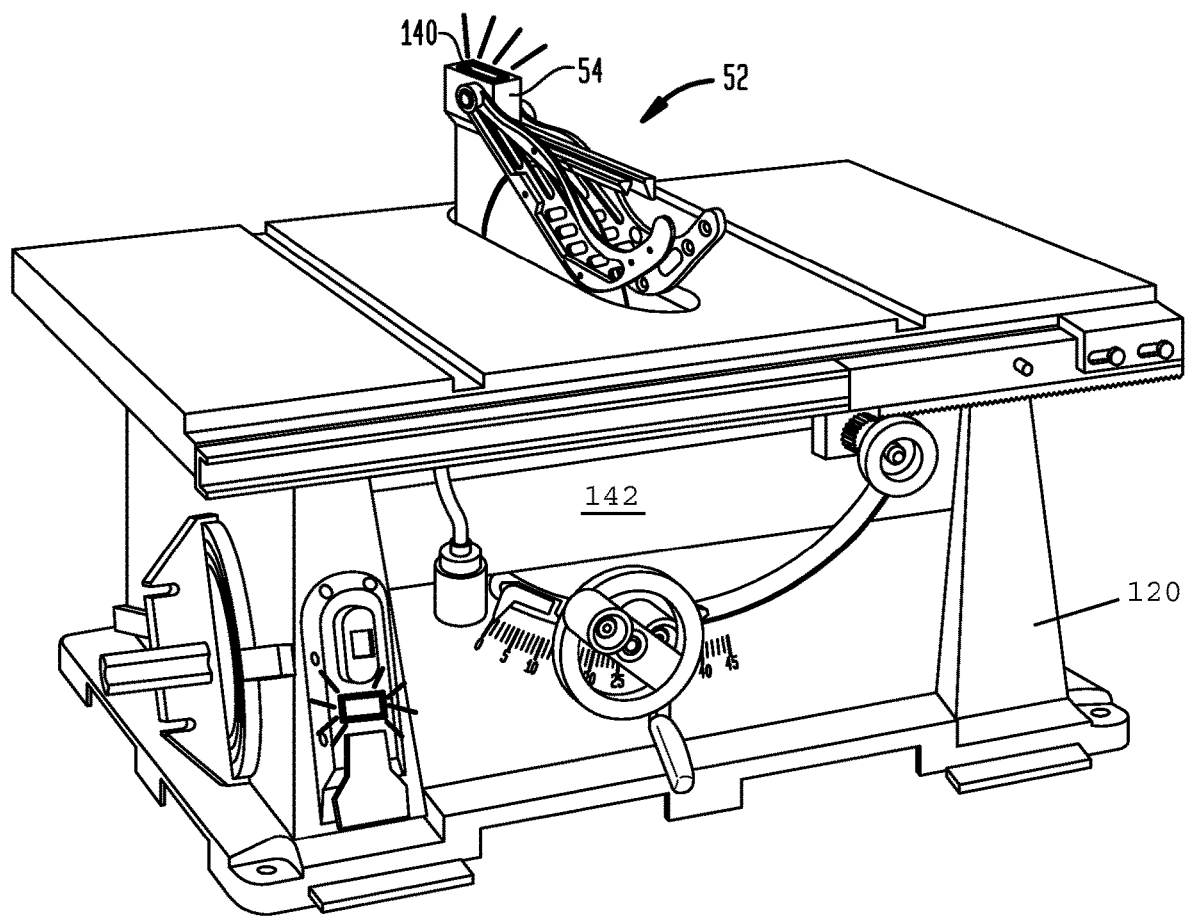
FIG. 13 shows a table saw having an integrated guard system, in accordance with one embodiment of the present invention.

Referring to FIG. 13, in one embodiment, a third indicator light 140 may be placed atop the top guard 54 of the top guard assembly 52 to provide an additional indicator that all of the guarding components are properly in place. The third indicator light 140 may be used to communicate to an operator that all of the guarding components are present and properly installed. In one embodiment, the third indicator light 140 is green. Placing an indicator light on the top guard assembly 52 to provide an indication that all of the guarding components are not in place would not be possible because the top guard 54 would not be present.

In one embodiment, the indicator lights mentioned above preferably help an operator to determine what steps are required and whether the guarding components are in place. In one embodiment, one or more of the indicator lights may be back lit or may be located next to the operating switches. In one embodiment, the operating switches and the indicator lights are preferably located on the front face of a support or frame for the table saw. When an operator is making a cut, however, the operator is typically paying attention to the blade area of the cutting blade 28 and is not able to look at the front face 142 of the base 120. Thus, the third indicator light 140 (FIG. 13) may be useful for communicating that all of the guarding is present during a cutting operation.

In one embodiment, one or more indicator lights may be provided atop the table. The indicators lights may be recessed so as to not interrupt the top surface of the table and/or interfere with the movement of workpieces positioned atop the table.

Although the present invention is not limited by any particular theory of operation, it is believed that the control system disclosed herein will increase the usage of guarding components by reminding an operator of the current status of his or her guard assembly. This feature may be particularly useful in instances where an operator approaches a table saw for the first time and seeks to determine the guard status of the table saw and/or to determine why the table saw is not operating. Moreover, an operator will have an incentive to reinstall all of the guarding components atop the table saw so as to limit the extra steps required for using the bypass switch to bypass the automatic shutdown of the table saw 20.

In one embodiment, the control system preferably includes a first sensor that senses if a splitter is properly installed atop the table saw. If the splitter has been removed or has been rotated into a low riving knife position, one or more sensors will detect that full guarding is not in place. In one embodiment, the one or more sensors desirably includes an array of three sensors that are in communication with the splitter. In one embodiment, if the splitter is rotated to a lowered or less than optimal guarding position, the array of three sensors will preferably detect the rotated condition and the status of the guard assembly and the information will be transmitted to the system controller.

In one embodiment, a second sensor assembly desirably detects the presence of the top guard and the side guards atop the table. If attempts are made to begin operating the power saw with the side guards spaced from the top surface of the table, the second sensor assembly will desirably detect the spacing and transmit the information to the system controller. The system controller will preferably prevent the system from operating until the side guards are returned to the completely down position. In one embodiment, the system controller will desirably allow continued operation of the table saw if the side guards are elevated after the table saw is started.

In one embodiment, if one or more of the guard assembly components are not in place when the operator attempts to activate the power switch, the second indicator light on the bypass switch will desirably blink once and then remain illuminated. In order to bypass the shut down, the bypass switch must preferably be activated or rotated. After the bypass switch has been activated, the second indicator light preferably blinks and the power switch may be activated or pulled to the ON position for operating the saw. The second indicator light preferably remains ON as long as the saw is operated. In one embodiment, once the power switch is returned to the OFF position, the saw may only be re-activated by once again rotating the bypass switch and pulling the power switch within a pre-determined time period.

In one embodiment, the control system preferably includes a time out interlock coupled with the bypass switch. After activating the bypass switch, if the power switch is not pulled to the ON position within a predetermined period of time (e.g. 10 seconds) of rotating the bypass switch, then power may not go to the motor for rotating the saw blade and the bypass switch must be rotated once again.

In one embodiment, the splitter preferably has an array of sensors in communication therewith that are used to indicate if the guard is removed, fully installed, or partly installed with the table. The splitter must desirably be fully installed into the table to operate the saw without performing the bypass operation disclosed herein. If the three sensors do not detect full installation of the splitter, the system will not operate. In one embodiment, sensor array desirably includes three sensors that form a unique combination of a closed, open and closed configuration that must be detected before operating the power saw without using the bypass mode. If the splitter is rotated into a low riving knife position, the closed, open, closed sensor array will not detect proper positioning of the splitter and the bypass mode must be activated. In other embodiments, other combinations of sensors may be used to detect whether the sensor is properly installed.

In one embodiment, the side guards may be lifted away from the table after the table saw has been activated. If the side guards are lifted after activation and during rotation of the cutting blade, then the control system will allow the cutting blade to continue rotation. If the side guards are lifted before the blade is initially rotated, then the system will preferably not operate the motor until the bypass switch is activated, and the power switch is pulled after activating the bypass switch.

In one embodiment, if the cutting blade is rotating and the splitter is removed during a cutting operation, the control system will preferably automatically shut down the motor and the saw blade will stop rotating.

In one embodiment, a front panel observable by an operator desirably includes a series of lights that may be illuminated. Each light is preferably associated with one of the components of the guard assembly. In one embodiment, a first light on the front panel is desirably associated with the splitter, a second light on the front panel is desirably associated with the top guard, and a third light on the front panel is desirably associated with the side guards. In one embodiment, the front panel may include indicator lights for showing if an anti kick back pawl is installed. If any one of the components is not in place, the lights on the front panel will preferably show which guard parts are properly installed and which guard parts are not properly installed.

In one embodiment, the bypass switch is preferably a momentary switch that may not be permanently held in the bypass mode position. After the bypass switch is activated, it must preferably be allowed to return to its normal position before the system may be operated. Thus, the bypass switch may not be pinned or held in the bypass state permanently, which prevents rigging the system to overcome the control system of the present invention.

Figure 14:
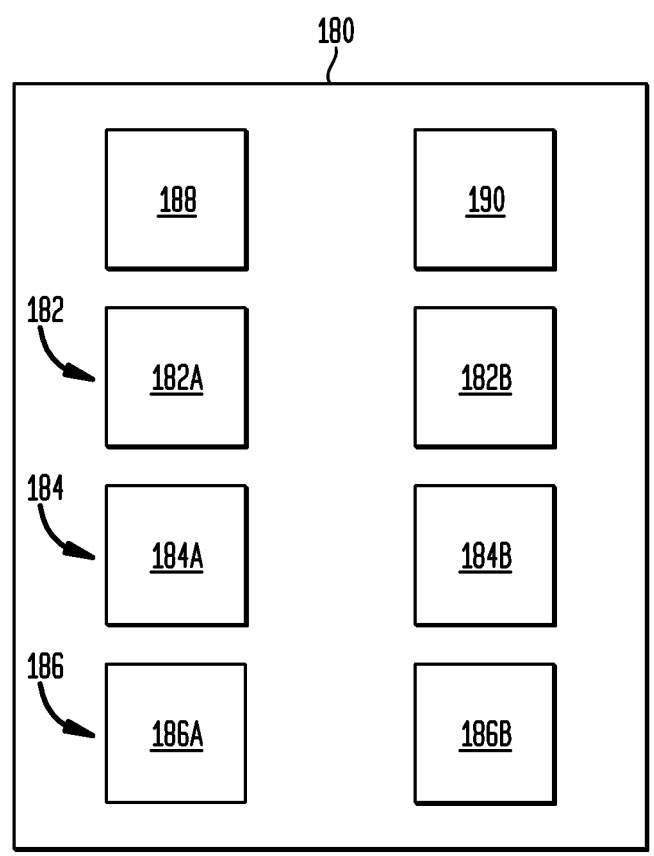
FIG. 14 shows a front view of an indicator panel for an integrated control system, in accordance with one embodiment of the present invention.

FIG. 14 shows a table saw having a control system including an indicator panel 180 provided on a front face of the table saw. The indicator panel 180 preferably includes a first bank of indicator lights 182 providing the status of the splitter, a second bank of indicator lights 184 providing information regarding the status of the top guard, and a third bank of indicator lights 186 providing the status of the side guard of the table saw. The first bank of indicator lights 182 desirably includes a first indicator light 182A that illuminates when the splitter is fully installed and a second indicator light 182B that illuminates when the splitter is not fully installed. The second bank of indicator lights 184 desirably includes a first indicator light 184A that illuminates when the top guard is fully installed and a second indicator light 184B that illuminates when the top guard is removed or not fully installed. The third bank of indicator lights 186 desirably includes a first indicator light 186A that illuminates when the side guard is properly installed and a second indicator light 186B that illuminates when the side guard is not properly installed or is spaced from the table prior to activating the motor.

The indicator panel 180 also preferably includes an indicator light 188 that is illuminated to provide an indication that all of the guard components are property installed and in place over the saw blade. If all of the components are properly installed and in place, the indicator light 188 desirably illuminates. In one embodiment, the indicator light 188 is green. The indicator panel 180 also preferably includes an indicator light 190 that illuminates if one or more of the components of the guard assembly are not installed or property positioned over the saw blade. In one embodiment, the indicator light 190 is red or yellow and illuminates if one or more of the guarding components are not properly installed.

FIG. 14 shows one preferred embodiment for providing an indication of whether all of the guarding components are in place. It is contemplated that other designs may be utilized and still fall within the scope of the present invention. For example, the indicator lights may replicate the shape of the guarding components. For example, a first bank of indicator lights may have the shape of a splitter, and a second bank of indicator lights may have the shape of a top guard of a guard assembly. A third bank of indicator lights may have the shape of the side guard. The parts may be illuminated a first color (e.g. green) when property installed and may be darkened or illuminated to a different color (e.g. red) when the particular guarding component is not properly installed.

Figure 15:
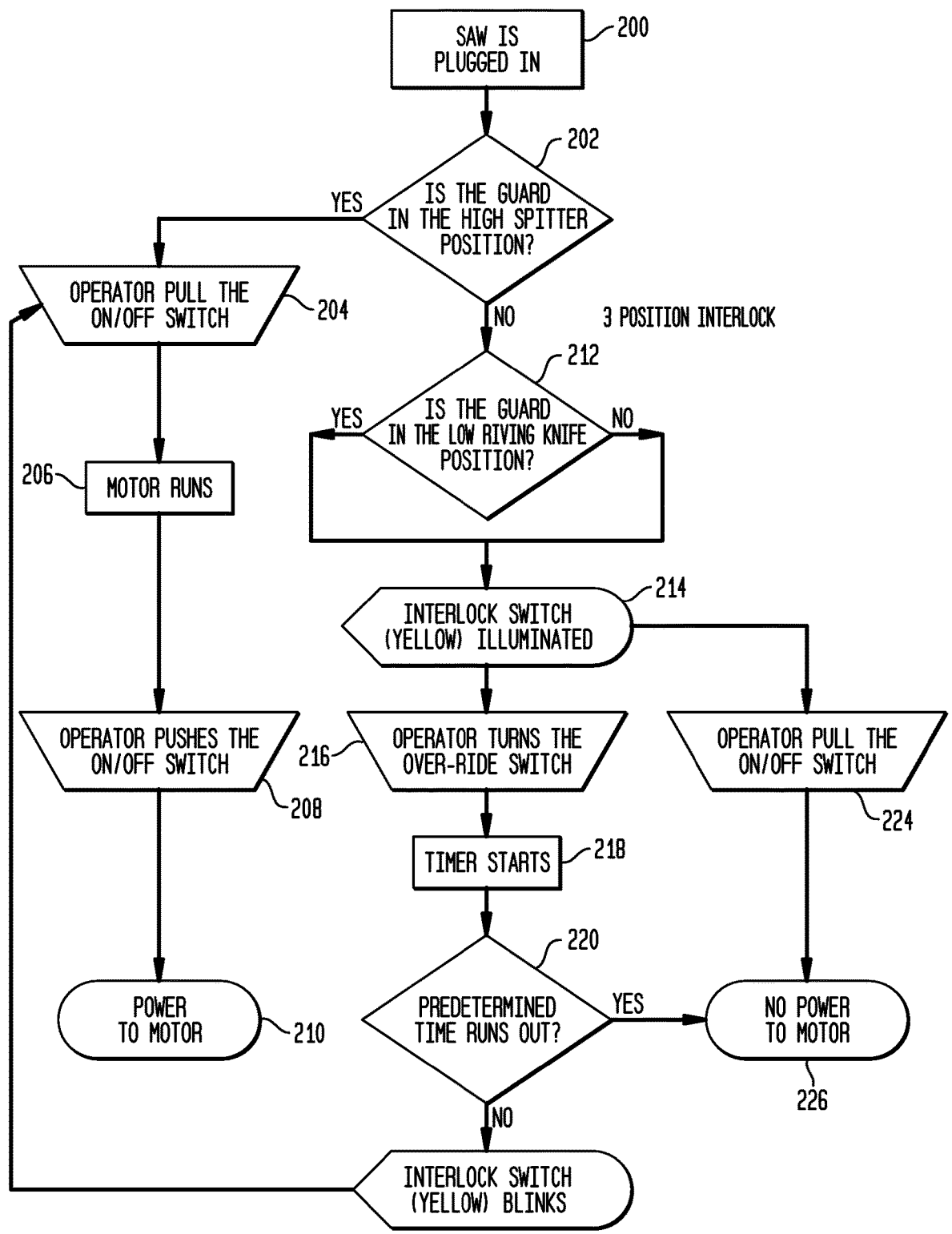
FIG. 15 shows a flow chart for operation of a control system integrated into a table saw in accordance with one embodiment of the present invention.

Referring to FIG. 15, in one embodiment, the central processing unit of the control system preferably includes one or more logic routines for operating the table saw. At the step designated 200, the power saw is preferably plugged in to provide electrical power. At the step designated 202, the system preferably determines if the splitter is in the high splitter position. If the sensors detect that the splitter is in the high position, an operator may pull the power switch to the ON position at the step designated 204 to run the motor (step designated 206). As the motor runs, the motor desirably rotates the cutting blade for cutting workpieces. At the step designated 208, the operator may push the on/off switch for cutting power to the motor (step designated 210).

If at the step designated 202, the central processing unit desirably detects that the splitter is not in the high splitter position, the CPU next determines at the step designated 212 if the guard is in the low riving knife position. If the guard is in the low riving knife position, the bypass switch is desirably illuminated yellow at the step designated 214. At the step designated 216, the operator may rotate the bypass switch which starts a pre-set timer at the step designated 218. The operator then preferably has a pre-determined time (step 220) to pull the power switch (204). After the operator turns the bypass switch at the step designated 216, the indicator light blinks yellow at the step designated 222. The operator may then complete the actions shown in steps 204-210. If the pre-determined time period expires at step 220, then no power is provided to the motor at step 224. Thus, even if the operator pulls the power on/off switch at step 226, no power will be provided to the motor at step 226.

The sensors used to determine if the splitter, the anti kickback pawl, the top guard, and the one or more side guards are in place may include any well known sensors used by those skilled in the art. These sensors may include Eddie current sensors, optical sensors, optical reflector sensors, rotobond position sensors, and contact micro switches.

Figure 16:
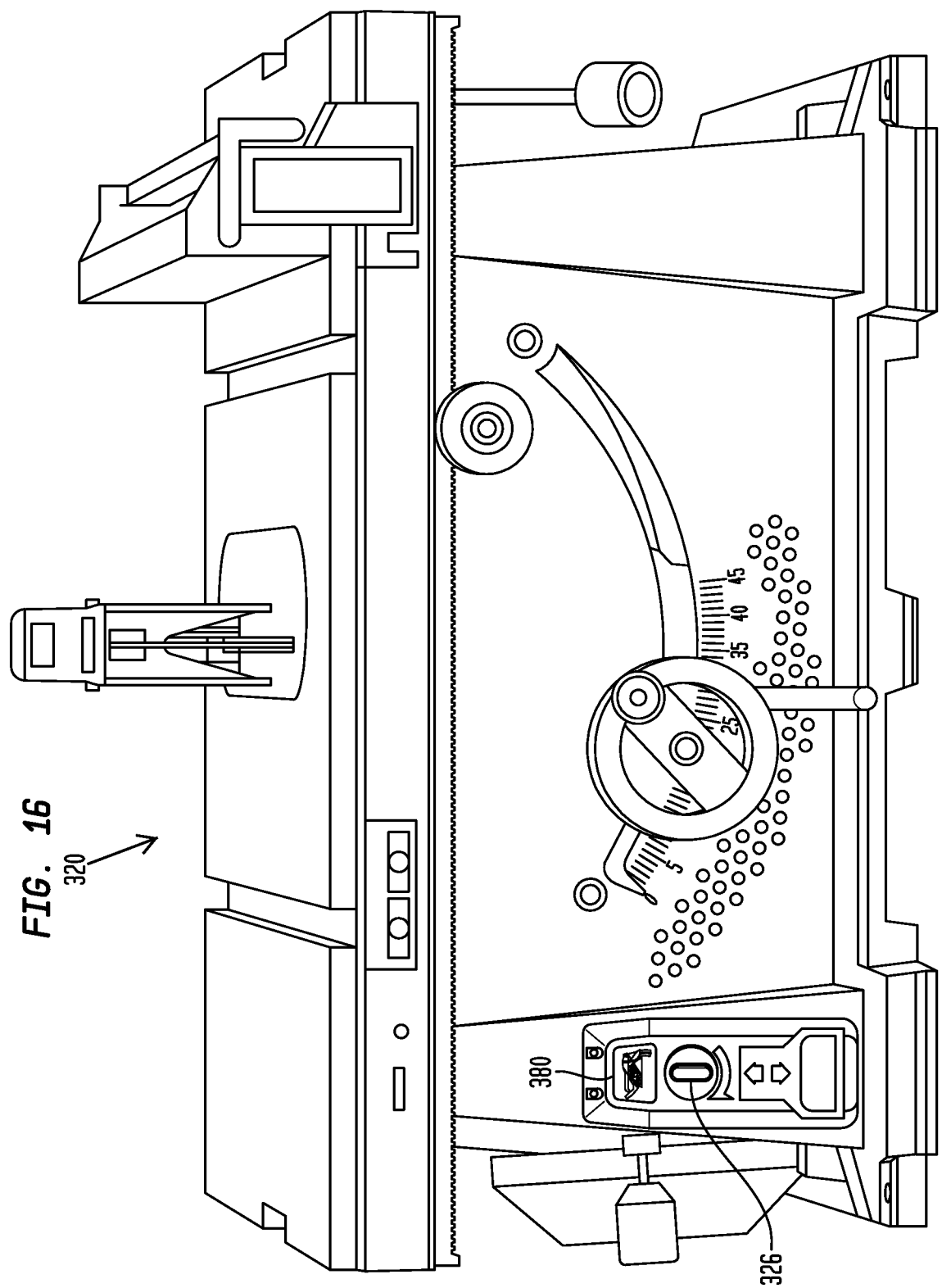
FIG. 16 shows a front perspective view of a table saw having an integrated control system, in accordance with one embodiment of the present invention.
Figure 17A:
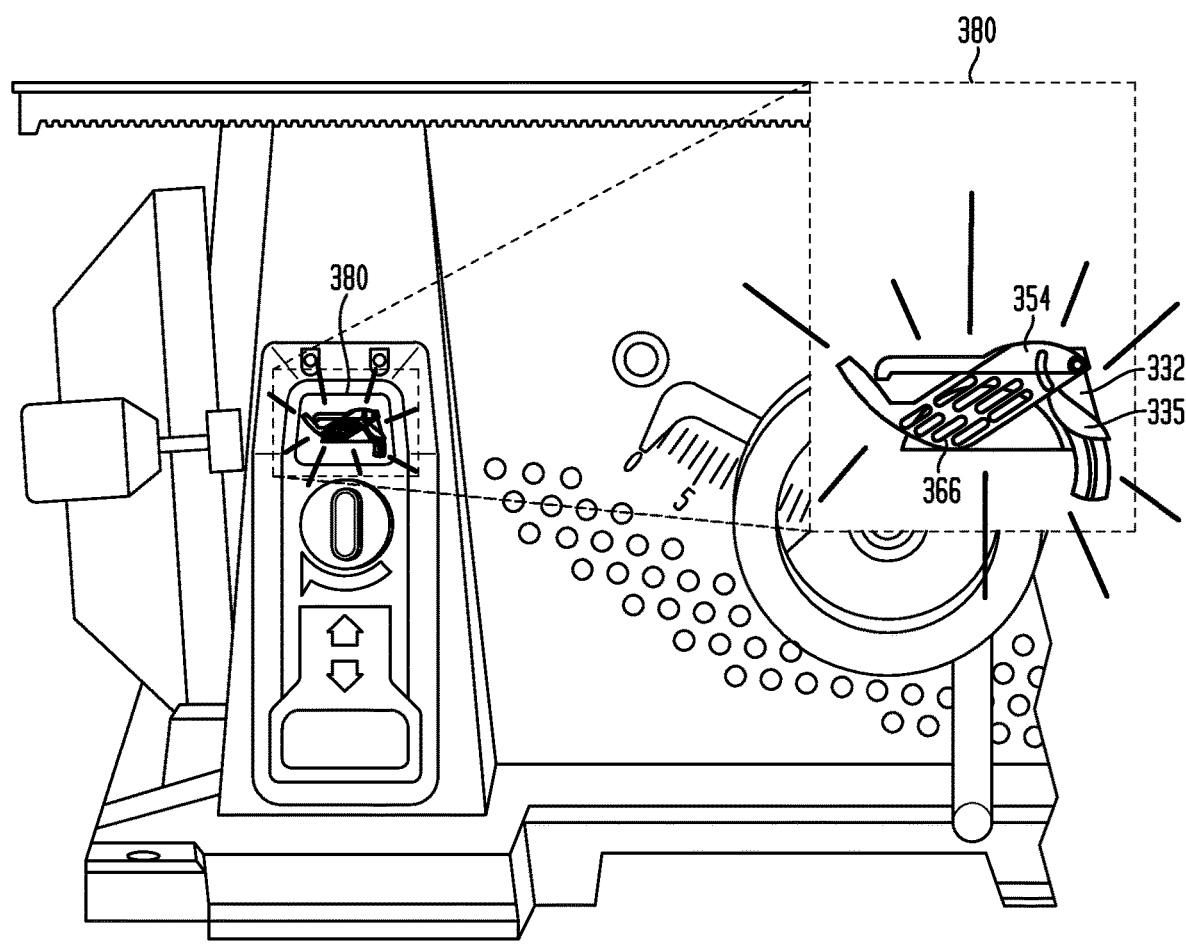
FIGS. 17A-17D show an indicator panel for the table saw shown in FIG. 16.

Referring to FIG. 16, in one embodiment, a table saw 320 having an integrated control system includes an indicator panel 380 located above a bypass switch 326. The indicator panel preferably provides an indication of the status of the guarding on the table saw. As a result, an operator may be able to instantly determine the status of the guarding when approaching the table saw. Referring to FIG. 17A, in one embodiment, the indicator panel 380 is adapted to be illuminated to show the various components of the guarding, namely the splitter 332, the anti kickback pawl 335, the top guard assembly 354, and the one or more side guards 366. Although FIG. 17A shows only four guard components, other embodiments may include additional guard components. In the embodiment shown in FIG. 17A, all of the guard components are in place so that the splitter 332, the anti kickback pawl 335, the top guard 354, and the one or more side guards 366 are illuminated. In one embodiment, the above-mentioned guard components are illuminated the color green. In other embodiments, other colors may be used to provide an indication of the status of the guard components.

Figure 17B:
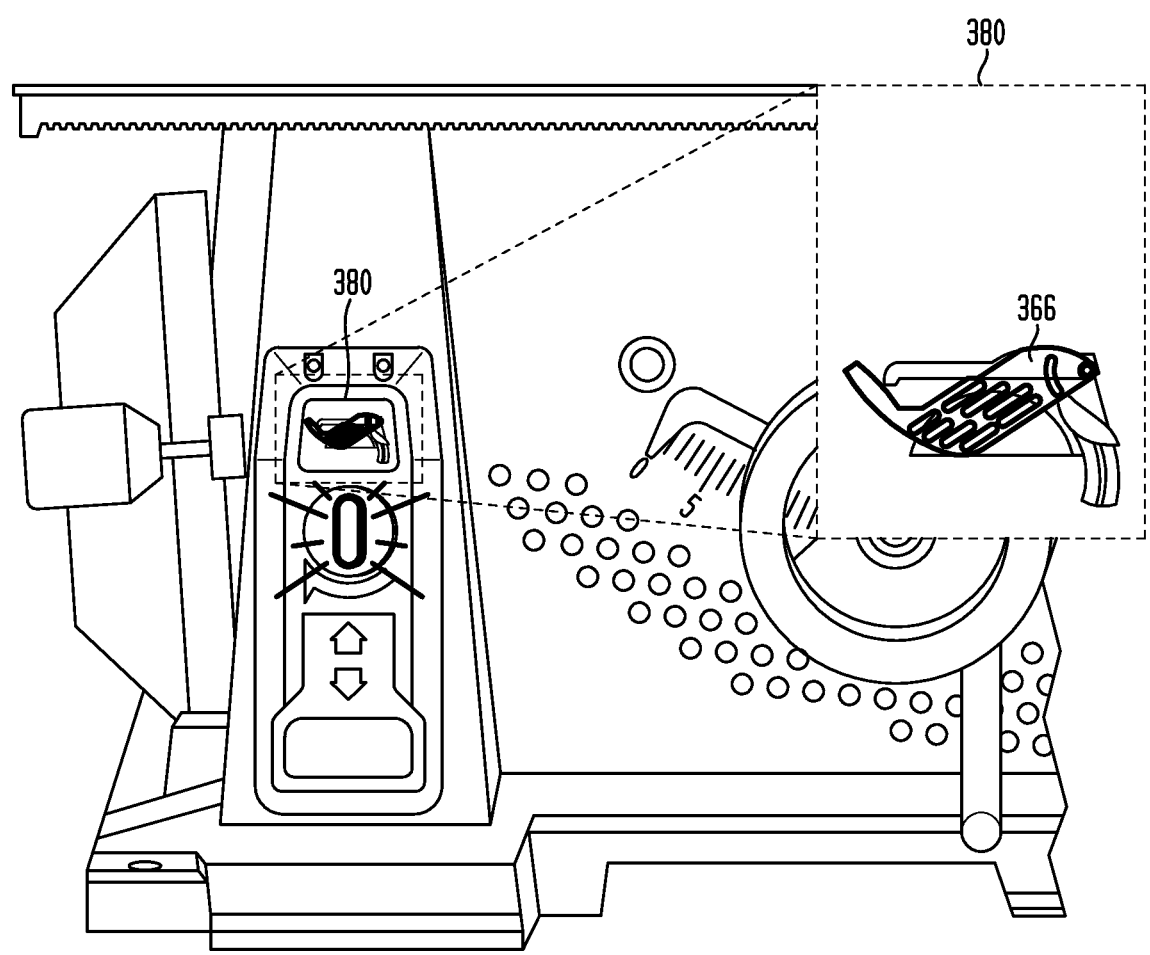
Figure 17C:
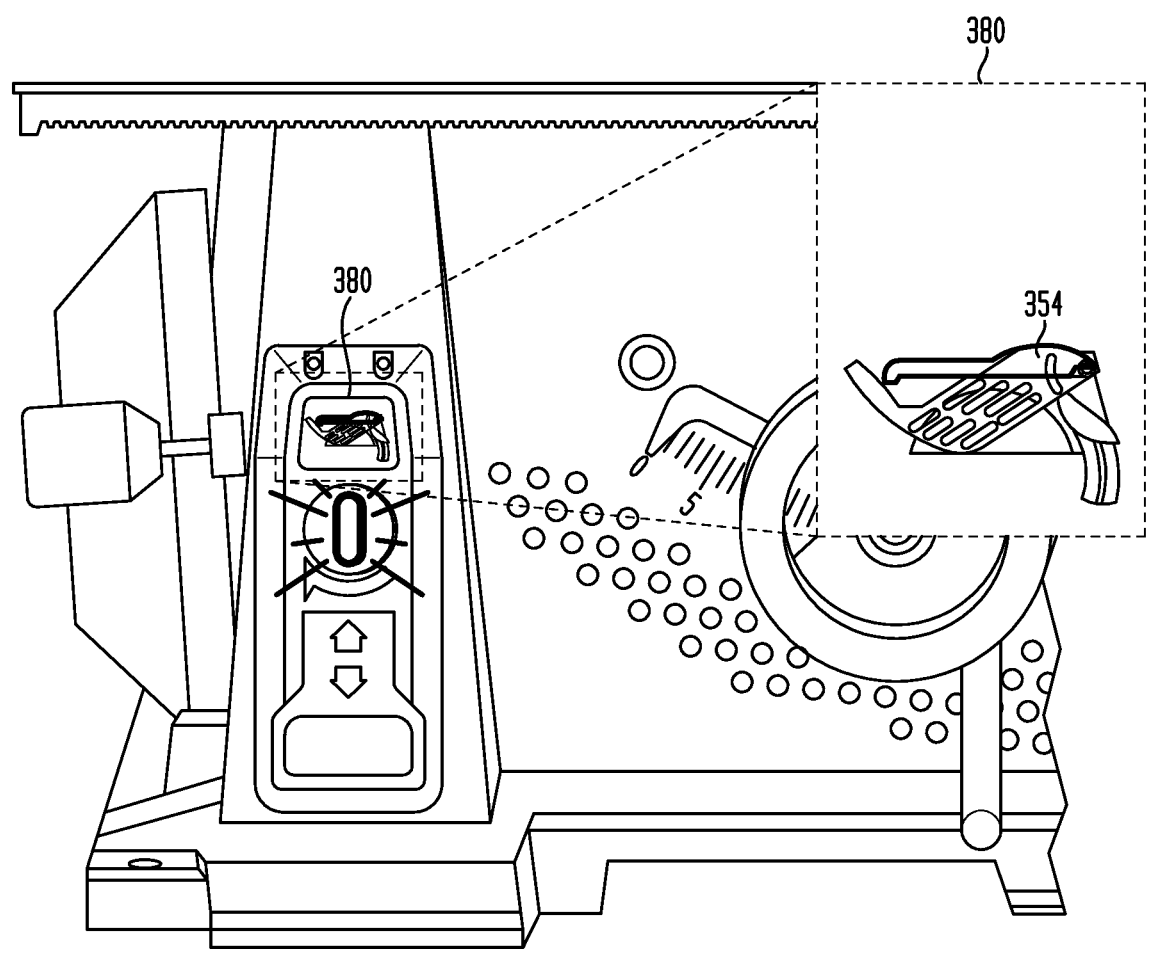
Figure 17D:
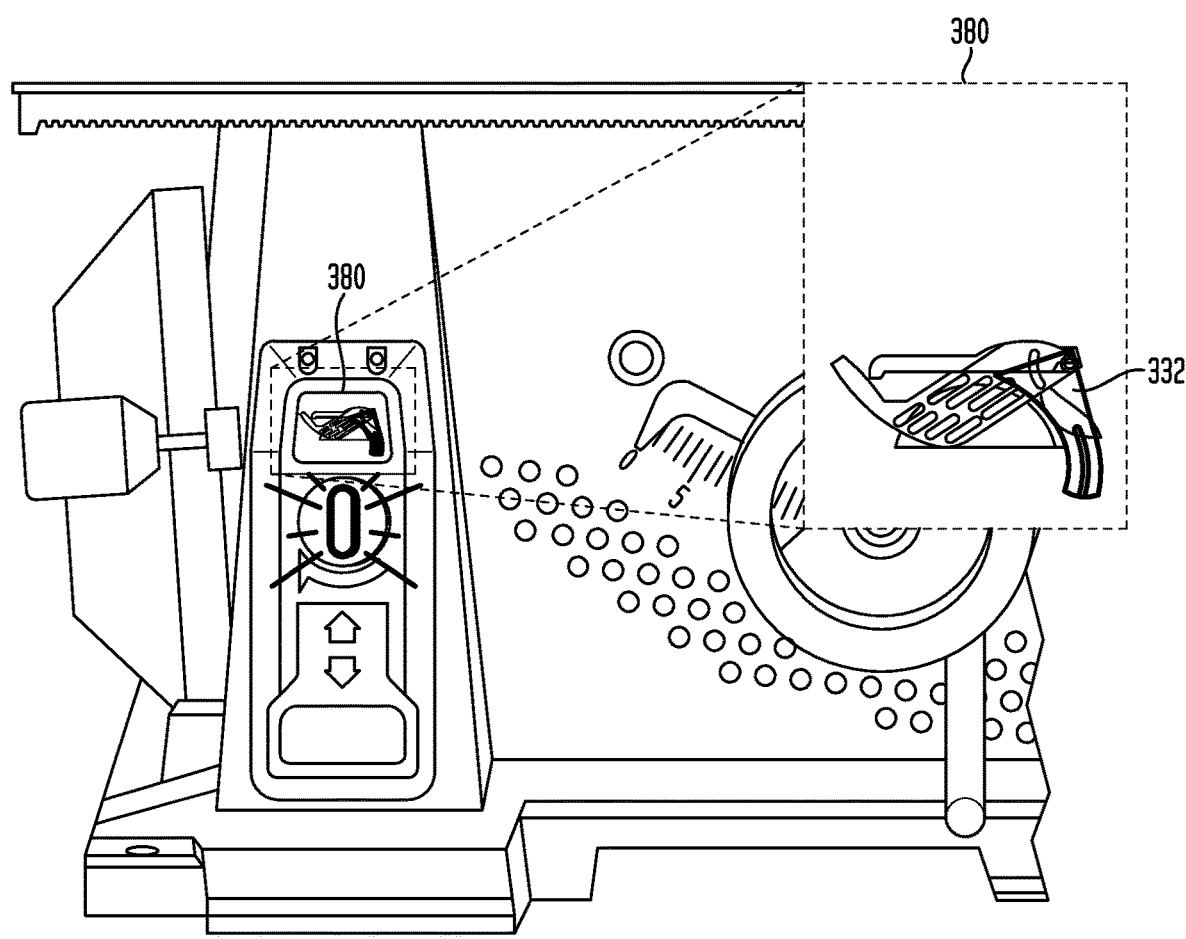

Referring to FIG. 17B, in one embodiment, the one or more side guards 366 are illuminated the color red to indicate that the one or more side guards are not properly installed and/or that the one or more side guards are rotated upwardly before the motor is started. In FIG. 17C, the top guard portion 354 of the indicator panel 380 is illuminated red to provide an indication that the top guard is not properly installed. In FIG. 17D, the splitter portion 332 of the indicator panel 380 is illuminated red to indicate that the splitter is not properly installed or that the splitter has been rotated into a low riving knife position.

Figure 18:
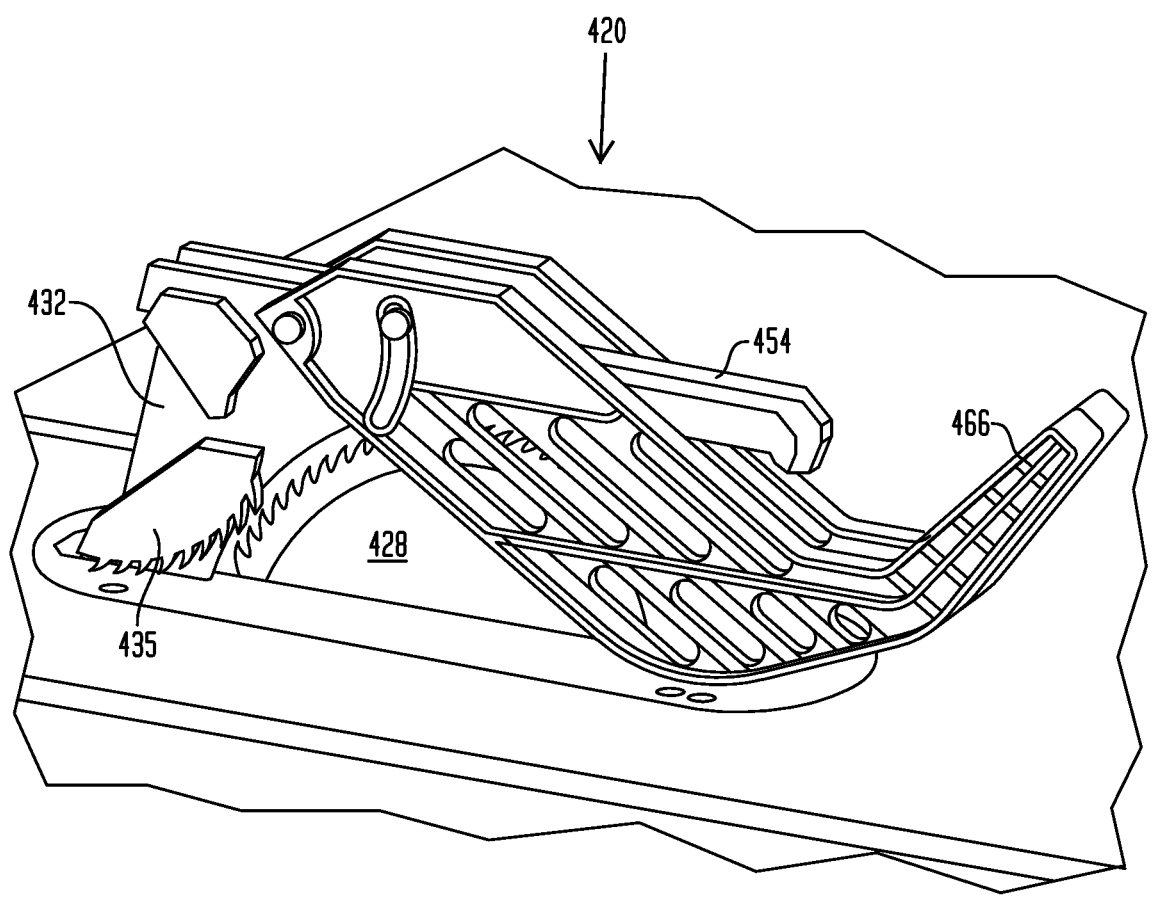
FIG. 18 shows a perspective side view of a table saw having a guard assembly including a splitter, an anti kickback pawl, a top guard, and a side guard, in accordance with one embodiment of the present invention.

Referring to FIG. 18, in one embodiment, a table saw 420 includes a cutting blade 428 that is protected by guarding including a splitter 432, an anti kickback pawl 435, a top guard assembly 454, and one or more side guards 466. The table saw preferably has an integrated control system that tracks the status of the guarding over the cutting blade 428. In one embodiment, the table saw includes an indicator panel 480 having a first region 488 that provides an indication if all of the guarding components are properly installed, a second region 490 associated with the status of the one or more side guards 466, a third region 492 associated with the status of the top guard 454, a fourth region 494 associated with the status of the anti kickback pawl 435, and a fifth region associated with the status of the splitter 432.

Referring to FIG. 19B, in one embodiment, the splitter 432, the anti kickback pawl 435, the top guard 454, and the one or more side guards 466 in the first region 488 of the indicator panel 480 are illuminated green when the guarding is properly installed. Referring to FIG. 19C, in one embodiment, the one or more side guards 466 shown in the second region 490 of the indicator panel 480 are illuminated the color red if the one or more side guards are not properly installed or if the one or more side guards are rotated upwardly from the table top before the motor is started. Referring to FIG. 19D, in one embodiment, the top guard 454 shown in the third region 492 of the indicator panel 480 is illuminated the color red if the top guard is not properly installed. Referring to FIG. 19E, in one embodiment, the anti kickback pawl 435 shown in the fourth region 494 of the indicator panel 480 is illuminated red if the anti kickback pawl is not properly installed. Referring to FIG. 19F, in one embodiment, the splitter 432 shown in the fifth region 496 of the indicator panel 480 is illuminated red if the splitter is not properly installed and/or if the splitter is rotated into the low riving knife position.

Figure 19G:
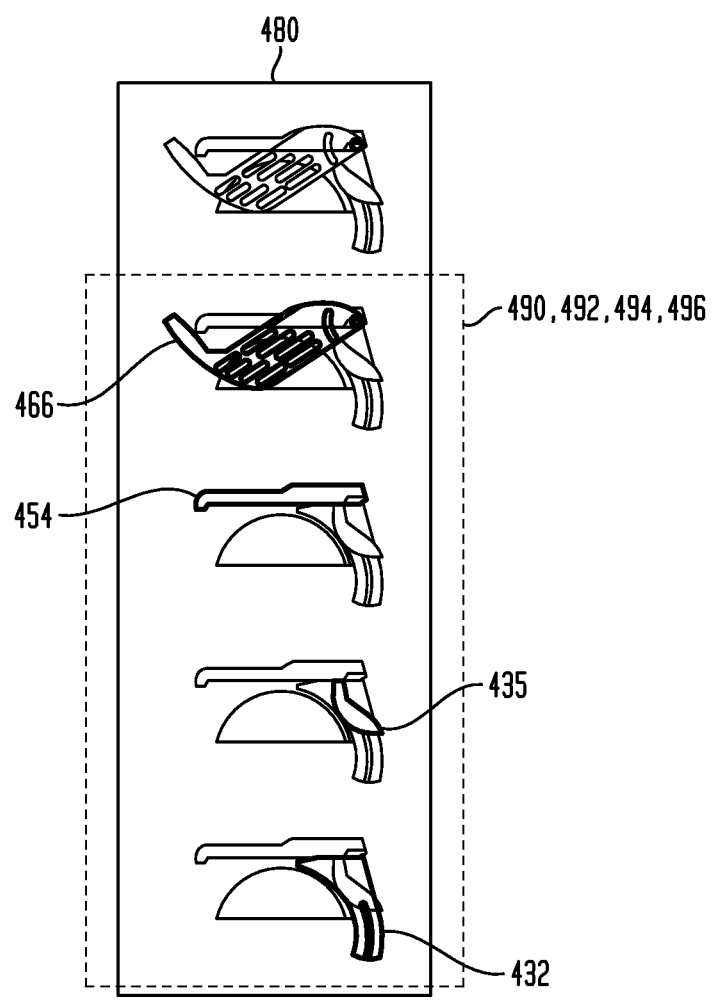

Referring to FIG. 19G, in one embodiment, the one or more side guards 466 in the second region 490, the top guard 454 in the third region 492, the anti kickback pawl 435 in the fourth region 494, and the splitter 432 in the fifth region 496 are illuminated red if the particular guard component is not properly installed. The splitter 432 may be illuminated red if the splitter is rotated into the low riving knife position. The one or more side guards 466 may be illuminated red if one of the side guards is rotated upwardly from the table top prior to starting the motor. In other embodiments, other colors may be used for providing an indication as to the status of the guarding.

Referring to FIGS. 20A-20C, in one embodiment, an integrated control system for a table saw includes an indicator panel 580 that may be illuminated to indicate the status of the guarding. Referring to FIGS. 20A and 20B, the indicator panel 580 preferably includes a first region 590 that shows the guard components and that is preferably illuminated green when the guard components are properly installed over the cutting blade. Referring to FIGS. 20A and 20C, the indicator panel preferably includes a second region 592 that shows the guard components and that is illuminated red when the guard components are not properly installed over the cutting blade. In one embodiment, the individual components of the guard assembly may be illuminated green or red to show the status of the various components. Other colors may also be used to indicate the status of the guarding.

Referring to FIGS. 21A-21C, in one embodiment, an integrated control system for a table saw includes an indicator panel 680 that may be illuminated. Referring to FIG. 21B, in one embodiment, the guard components illustrated on the indicator panel are illuminated green if all of the guard components are properly installed. Referring to FIG. 21C, in one embodiment, the guard components illustrated on the indicator panel are illuminated red if one or more of the guard components are not properly installed. In the embodiment of FIGS. 21A-21C, one or more of the guard components may be illuminated a first color (e.g. green) while one or more of the remaining guard components are illuminated a second color (e.g. red or yellow). Although the colors green, red, and yellow have been described, other colors may be used for indicating the status of the guarding.

The headings used herein are for organizational purposes only and are not meant to limit the scope of the description or the claims. As used throughout this application, the word

What is claimed is:

1. A power tool having an integrated control system comprising:
   a table including a workpiece supporting surface;
   a cutting instrument extendable above the workpiece supporting surface;
   a carriage located below said table and coupled with said cutting instrument;
   a guard assembly disposed above the workpiece supporting surface for covering at least a portion of said cutting instrument, said guard assembly having a lower end installed in said carriage;
   a motor coupled with said cutting instrument;
   a power switch operable for starting said motor for driving said cutting instrument;
   said control system including at least one sensor provided on said carriage located below said table for determining if said guard assembly is installed in said carriage, wherein before said motor is started said control system automatically disables said motor if it determines that said guard assembly is not installed in said carriage, wherein said control system includes a bypass switch operable for bypassing said control system and starting said motor when said guard assembly is not installed in said carriage, and wherein after said motor is started and is rotating said cutting instrument said control system automatically disables said motor if it determines that the lower end of said guard assembly is not installed in said carriage.

2. The power tool as claimed in claim 1, wherein said power switch comprises a first indicator light that is illuminated when said motor is running and that is de-activated when said motor is shut down.

3. The power tool as claimed in claim 2, wherein said bypass switch comprises a second indicator light that is continuously illuminated when said control system determines that said guard assembly is not installed in said carriage.

4. The power tool as claimed in claim 3, wherein said second indicator light blinks after said bypass switch is activated and while said motor is running.

5. The power tool as claimed in claim 1, wherein said power switch is pulled in a first direction for supplying power to said motor and is pushed in a second opposite direction for stopping the supply of power to said motor, and wherein said bypass switch is rotatable for bypassing said control system.

6. The power tool as claimed in claim 1, wherein said bypass switch is a momentary switch.

7. The power tool as claimed in claim 6, wherein said control system includes a time-out feature associated with said bypass switch.

8. The power tool as claimed in claim 7, wherein the time-out feature requires said power switch to be moved into an ON position for starting said motor within a predetermined time period after activating said bypass switch.

9. The power tool as claimed in claim 8, wherein the predetermined time period is between 1-30 seconds in length.

10. The power tool as claimed in claim 1, wherein said power tool is a table saw.

11. The power tool as claimed in claim 1, wherein said carriage is tiltable relative to the workpiece supporting surface so that said guard assembly and said carriage tilt together when said guard assembly is installed in said carriage.

12. The power tool as claimed in claim 1, wherein said guard assembly comprises a splitter including the lower end of said guard assembly installed in said carriage, and wherein said splitter has an aperture that is alignable with said at least one sensor provided on said carriage that enables said control system to determine that said guard assembly is installed in said carriage.

13. A power tool having an integrated control system comprising:
   a table including a workpiece supporting surface;
   a cutting instrument extendable above the workpiece supporting surface;
   a carriage located below said table and coupled with said cutting instrument;
   a guard assembly disposed above the workpiece supporting surface for covering at least a portion of said cutting instrument, said guard assembly having a lower end installed in said carriage;
   a motor coupled with said cutting instrument for driving said cutting instrument;
   a power switch moveable in a first direction for starting said motor for driving said cutting instrument;
   said control system including one or more sensors provided on said carriage located below said table for determining if said guard assembly is installed in said carriage, wherein said control system disables said motor if said one or more sensors detect that said guard assembly is not installed in said carriage, wherein said control system includes a bypass switch for bypassing said control system to enable starting said motor with said guard assembly not installed in said carriage, and wherein after said motor is started and is rotating said cutting instrument said control system automatically disables said motor if it determines that the lower end of said guard assembly is not installed in said carriage.

14. The power tool as claimed in claim 13, wherein said bypass switch is a momentary bypass switch and said control system includes a time-out feature that requires said power switch to be pulled within a predetermined time period after activating said momentary bypass switch.

15. The power tool as claimed in claim 14, wherein said bypass switch is moveable in a second direction that is different than the first direction for said power switch.

16. The power tool as claimed in claim 13, wherein said power switch includes a first indicator light for indicating if said motor is running, and said bypass switch includes a second indicator light for indicating if said guard assembly is installed or not installed in said carriage.

17. The power tool as claimed in claim 16, wherein said second indicator light is continuously illuminated if said guard assembly is not installed in said carriage and said motor is not running, and said second indicator light blinks after said bypass switch has been activated and while said motor is running.

18. The power tool as claimed in claim 13, wherein said power tool is a table saw and wherein said guard assembly comprises a splitter and a top guard assembly securable atop said splitter.

19. The power tool as claimed in claim 18, wherein said control system comprises: a first sensor assembly associated with said splitter for determining whether said splitter is in the first state or the second state; and a second sensor assembly associated with said top guard assembly for determining whether said top guard assembly is secured atop said splitter.

20. The power tool as claimed in claim 13, wherein said carriage is tiltable relative to the workpiece supporting surface so that said guard assembly and said carriage tilt together when said guard assembly is installed in said carriage.

21. The power tool as claimed in claim 13, wherein said guard assembly comprises a splitter including the lower end of said guard assembly installed in said carriage, and wherein said splitter has an aperture that is alignable with said one or more sensors provided on said carriage that enables said control system to determine that said guard assembly is installed in said carriage.

22. A table saw having an integrated control system comprising:
- a table having a top surface;
- a cutting blade extendable above the top surface of said table;
- a carriage located below said table and coupled with said cutting blade;
- a guard assembly coupled with said table for covering at least a portion of said cutting blade, said guard assembly having a lower end installed in said carriage located below said table, wherein said carriage is tiltable relative to the top surface of said table so that said guard assembly and said carriage tilt together when the lower end of said guard assembly is installed in said carriage;
- a motor coupled with said cutting blade;
- a power switch moveable in a first direction for starting said motor so as to drive said cutting blade;
- said control system being in communication with said guard assembly and including one or more sensors provided on said carriage located below said table for determining if said guard assembly is installed in said carriage, wherein said control system automatically disables said motor if said motor has not yet been started and when said guard assembly is not installed in said carriage, wherein said control system includes a bypass switch having an indicator light for providing an indication of whether said guard assembly is installed in said carriage or not installed in said carriage, and wherein after said motor is started and is rotating said cutting blade said control system automatically disables said motor if it determines that the lower end of said guard assembly is not installed in said carriage.

23. The table saw as claimed in claim 22, wherein said bypass switch is moveable in a second direction that is different than the first direction of said power switch for bypassing said control system and starting said motor for operating said table saw when said guard assembly is not installed in said carriage.

24. The table saw as claimed in claim 23, wherein said power switch is pulled for starting said motor and pushed for stopping said motor, and wherein said bypass switch is rotated for bypassing said control system and running said motor when said guard assembly is not installed in said carriage.

25. The power tool as claimed in claim 22, wherein said guard assembly comprises a splitter including the lower end of said guard assembly installed in said carriage, and wherein said splitter has an aperture that is alignable with said one or more sensors provided on said carriage that enables said control system to determine that said guard assembly is installed in said carriage.

* * * * *